United States Patent
Teranishi et al.

(10) Patent No.: US 9,916,056 B2
(45) Date of Patent: Mar. 13, 2018

(54) TOUCH DETECTION DEVICE AND DISPLAY DEVICE WITH TOUCH DETECTION FUNCTION

(71) Applicant: Japan Display Inc., Tokyo (JP)

(72) Inventors: Yasuyuki Teranishi, Tokyo (JP); Koji Noguchi, Tokyo (JP); Satoru Noguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/133,785

(22) Filed: Apr. 20, 2016

(65) Prior Publication Data

US 2016/0313829 A1 Oct. 27, 2016

(30) Foreign Application Priority Data

Apr. 23, 2015 (JP) ................................. 2015-088790

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0418* (2013.01)

(58) Field of Classification Search
CPC .... G06F 3/0412; G06F 3/0416; G06F 3/0418; G06F 3/044; G06F 2203/04112; G02F 1/13338; G02F 1/134336; G02F 2201/123
See application file for complete search history.

(56) References Cited

U.S. PATENT DOCUMENTS

| 2010/0026660 A1* | 2/2010 | Kitamura | G06F 3/044 345/174 |
| 2010/0321315 A1* | 12/2010 | Oda | G06F 3/044 345/173 |
| 2011/0267295 A1* | 11/2011 | Noguchi | G06F 3/0416 345/173 |
| 2011/0291939 A1* | 12/2011 | Tsukahara | G06F 3/044 345/168 |
| 2012/0062511 A1* | 3/2012 | Ishizaki | G06F 3/044 345/174 |

(Continued)

FOREIGN PATENT DOCUMENTS

JP 2012-068980 4/2012

*Primary Examiner* — Joe H Cheng
(74) *Attorney, Agent, or Firm* — K&L Gates LLP

(57) ABSTRACT

A touch detection device includes: drive electrodes that extend in a first direction and are arranged in a second direction intersecting with the first direction; detection electrodes that extend in the second direction and are arranged in the first direction to form capacitance at intersections with the drive electrodes; a driving and scanning unit that sequentially and time-divisionally selects a predetermined number of drive target electrodes to which drive signals are applied from the drive electrodes, and performs driving and scanning at a pitch smaller than a total width of a drive range including the drive target electrodes; and a coordinate correction unit that uses correction information based on a relationship between an input position at which an external object is in proximity to or in contact with a touch detection surface and a detection position detected by the detection electrodes to correct the detection position in the first direction.

16 Claims, 19 Drawing Sheets

(56) References Cited

U.S. PATENT DOCUMENTS

| | | | |
|---|---|---|---|
| 2012/0075239 A1 | 3/2012 | Azumi et al. | |
| 2012/0146931 A1* | 6/2012 | Iida | G06F 3/0418 345/173 |
| 2012/0293453 A1* | 11/2012 | Yamada | G06F 3/0416 345/174 |
| 2013/0076700 A1* | 3/2013 | Chiu | G06F 3/0418 345/179 |
| 2013/0176247 A1* | 7/2013 | Jogo | G06F 3/041 345/173 |
| 2013/0244731 A1* | 9/2013 | Oishi | H04M 1/23 455/566 |
| 2013/0321328 A1* | 12/2013 | Ahn | G06F 3/03549 345/174 |
| 2014/0152616 A1* | 6/2014 | Kida | G06F 3/0418 345/174 |
| 2014/0184561 A1* | 7/2014 | Kim | G06F 3/044 345/174 |
| 2014/0192018 A1* | 7/2014 | Kurasawa | G06F 3/044 345/174 |
| 2014/0210741 A1* | 7/2014 | Komatsu | G06F 3/0418 345/173 |
| 2014/0293159 A1* | 10/2014 | Adachi | G06F 3/0412 349/12 |
| 2016/0034105 A1* | 2/2016 | Yamashirodani | G06F 3/0418 345/173 |
| 2016/0306492 A1* | 10/2016 | Togashi | G06F 3/033 |

\* cited by examiner

TOUCH DETECTION DEVICE AND DISPLAY DEVICE WITH TOUCH DETECTION FUNCTION

CROSS-REFERENCE TO RELATED APPLICATIONS

This application claims priority from Japanese Application No. 2015-088790, filed on Apr. 23, 2015, the contents of which are incorporated by reference herein in its entirety.

BACKGROUND

1. Technical Field

The present invention relates to a touch detection device and a display device with a touch detection function.

2. Description of the Related Art

In recent years, attention has been given to a touch detection device, referred to as a touch panel, capable of detecting an object approaching from the outside as a target. Japanese Patent Application Laid-open Publication No. 2012-68980 (JP-A-2012-68980) describes a touch detection device including a plurality of drive electrodes, a plurality of detection electrodes, and a driving and scanning unit. The touch detection device described in JP-A-2012-68980 is a detection device of a capacitance type in which the drive electrode and the detection electrode extend in respective directions such that they intersect with each other, and capacitance is formed at the intersection. The driving and scanning unit sequentially and time-divisionally selects a predetermined number of drive target electrodes from the drive electrodes. The driving and scanning unit then performs driving and scanning by applying a drive signal for detecting an external proximity object to the selected drive target electrodes. The scanning pitch for driving and scanning of the drive electrodes is made smaller than the total width of the selected drive target electrodes. Accordingly, it is possible to achieve high position resolution while increasing the detection sensitivity.

However, even though the touch detection device described in JP-A-2012-68980 can improve detection accuracy in the driving and scanning direction for scanning the drive signal, JP-A-2012-68980 does not describe detection accuracy in the direction intersecting with the driving and scanning direction, i.e., the direction in which the drive electrodes extend. If an input operation is performed using a position indication device such as a stylus pen, an error may arise between the input position of actual input and the detection position detected by the detection electrode depending on the use state of the position indication device.

SUMMARY

A touch detection apparatus includes: a plurality of drive electrodes that extend in a first direction and that are arranged in a second direction intersecting with the first direction; a plurality of detection electrodes that extend in the second direction, and that are arranged in the first direction so as to form capacitance at intersections with the drive electrodes; a driving and scanning unit configured to sequentially and time-divisionally select a predetermined number of drive target electrodes to which drive signals are to be applied from the drive electrodes, and perform driving and scanning at a scanning pitch smaller than a total width of a drive range including the selected drive target electrodes; and a coordinate correction unit configured to use correction information obtained from a relationship between an input position at which an external object is in proximity to or in contact with a touch detection surface and a detection position detected by the detection electrodes to correct the detection position in the first direction.

DETAILED DESCRIPTION

Figure 1:
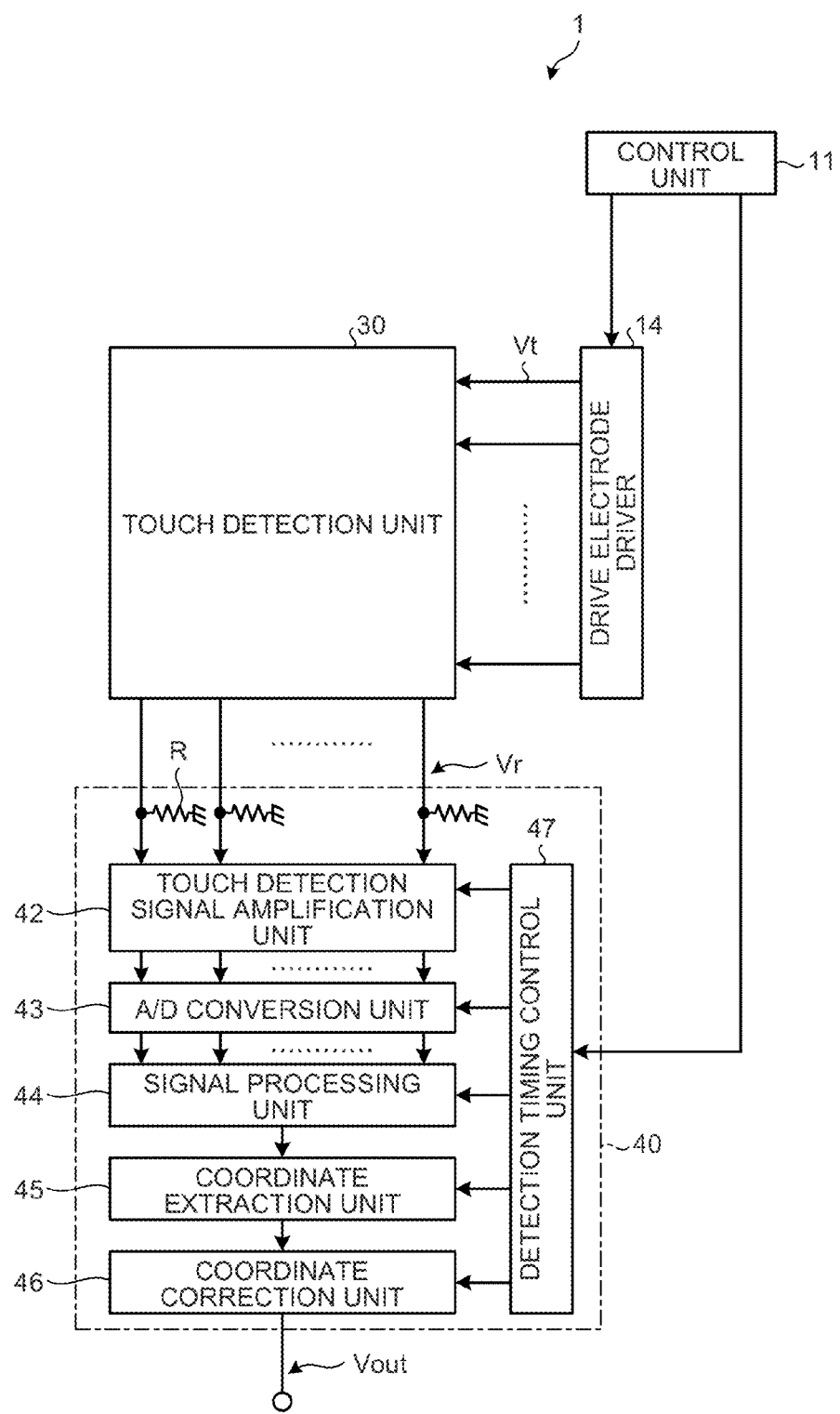
FIG. 1 is a block diagram illustrating a configuration example of a touch detection device according to an embodiment of the present invention.

Exemplary aspects (embodiments) according to the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only, and various changes made without departing from the spirit of the invention and easily conceivable by those skilled in the art naturally fall within the scope of the invention. The drawings may possibly illustrate the width, the thickness, the shape, and other elements of each unit more schematically than the actual aspect to simplify the explanation. These elements, however, are given by way of example only and are not intended to limit interpretation of the invention. In the specification and the figures, components similar to those previously described with reference to a preceding figure are denoted by like reference numerals, and overlapping explanation thereof will be appropriately omitted.

FIG. 1 is a block diagram illustrating a configuration example of a touch detection device according to an embodiment of the present invention. As illustrated in FIG. 1, a touch detection device 1 of the embodiment includes a control unit 11, a drive electrode driver 14, a touch detection unit 30, and a touch detection signal processing unit 40.

The control unit 11 outputs control signals to the drive electrode driver 14 and the touch detection signal processing unit 40, respectively. The control unit 11 controls the drive electrode driver 14 and the touch detection signal processing unit 40 in a synchronized manner. The drive electrode driver 14 is a circuit that outputs a drive signal Vt to the touch detection unit 30 based on the control signal input from the control unit 11. The touch detection unit 30 operates based on the basic principle of a touch detection method of a capacitance type, and outputs a touch detection signal Vr according to a change in capacitance caused by an external object being in proximity to or in contact with the device.

The touch detection signal processing unit 40 is a circuit that detects the presence or absence of a touch (a contact state described below) on the touch detection unit 30 based on the control signal input from the control unit 11 and the detection signal Vr input from the touch detection unit 30. When detecting that there is a touch, the touch detection signal processing unit 40 obtains coordinates thereof and the like in a touch detection region. The touch detection signal processing unit 40 includes a touch detection signal amplification unit 42, an A/D conversion unit 43, a signal processing unit 44, a coordinate extraction unit 45, a coordinate correction unit 46, and a detection timing control unit 47.

The touch detection signal amplification unit 42 amplifies the detection signal Vr input from the touch detection unit 30. The touch detection signal amplification unit 42 may include an analog LPF (Low Pass Filter) that removes a high frequency component (noise component) included in the detection signal Vr and then outputs the detection signal Vr. The A/D conversion unit 43 is a circuit that samples an analog signal output from the touch detection signal amplification unit 42 at timing synchronized with the drive signal Vt to convert the analog signal into a digital signal. The signal processing unit 44 is a logic circuit that detects the presence or absence of the input operation on the touch detection unit 30 based on the output signal of the A/D conversion unit 43. The coordinate extraction unit 45 is a logic circuit that, when the signal processing unit 44 has detected the input operation, obtains its input position by an interpolation operation and the like. The coordinate correction unit 46 determines the inclination and the like of a position indication device 51 and corrects the input position obtained by the coordinate extraction unit 45. The detection timing control unit 47 is configured to control these circuits such that the circuits operate in a synchronized manner.

Figure 2:
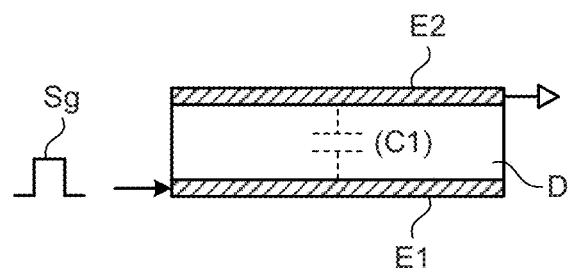
FIG. 2 is a diagram illustrating a state where a finger is not in contact with or in proximity to a device to explain the basic principle of a touch detection method of a capacitance type.
Figure 3:
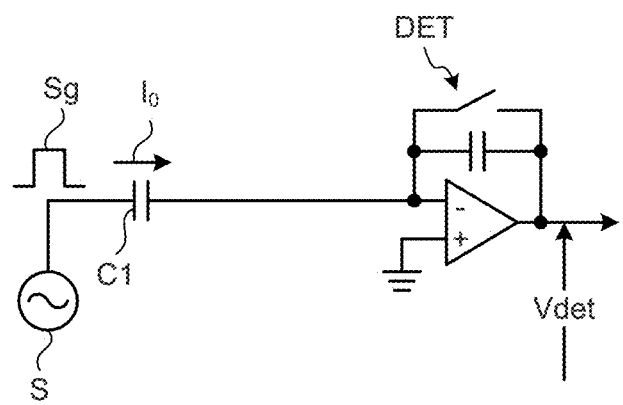
FIG. 3 is a diagram illustrating an example of an equivalent circuit in the state where the finger is not in contact with or in proximity to the device illustrated in FIG. 2.
Figure 4:
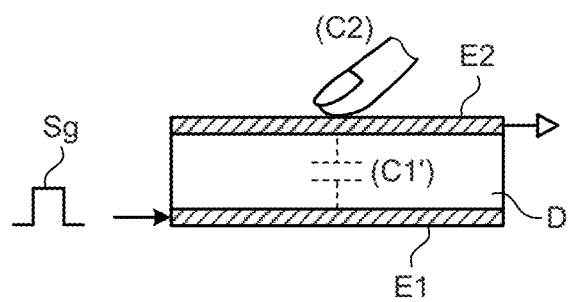
FIG. 4 is a diagram illustrating a state where a finger is in contact with or in proximity to a device to explain the basic principle of the touch detection method of the capacitance type.
Figure 5:
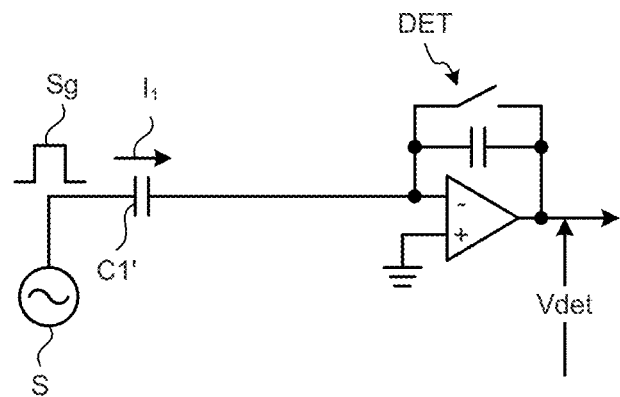
FIG. 5 is a diagram illustrating an example of an equivalent circuit in the state where the finger is in contact with or in proximity to the device illustrated in FIG. 4.
Figure 6:
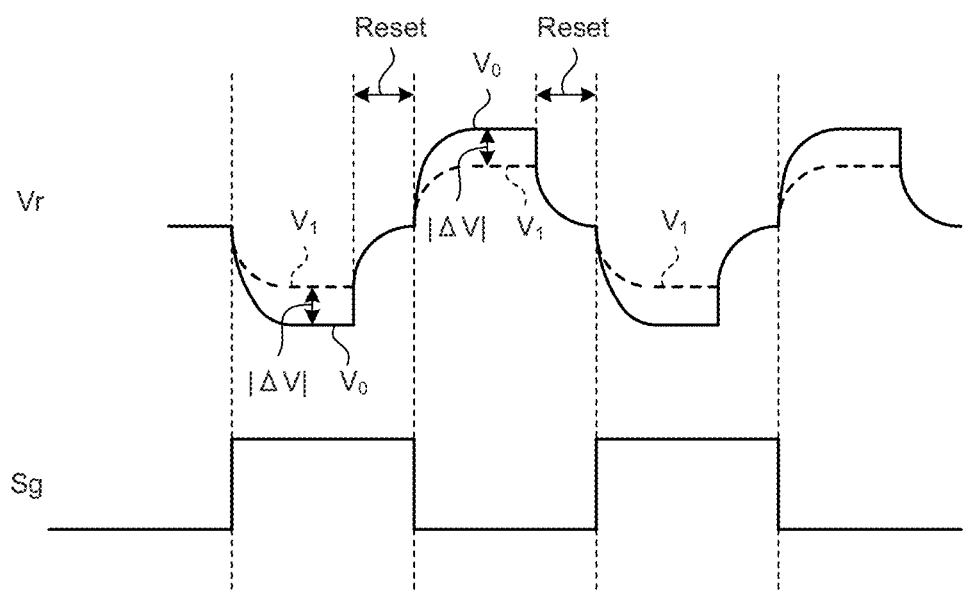
FIG. 6 is a diagram illustrating examples of waveforms of a drive signal and a touch detection signal.

As described above, the touch detection unit 30 operates based on the basic principle of the touch detection method of the capacitance type. The basic principle of touch detection of the touch detection device 1 according to the embodiment is described with reference to FIGS. 2 to 6. FIG. 2 is a diagram illustrating a state where a finger is not in contact with or in proximity to a device to explain the basic principle of the touch detection method of the capacitance type. FIG. 3 is a diagram illustrating an example of an equivalent circuit in the state where the finger is not in contact with or in proximity to the device illustrated in FIG. 2. FIG. 4 is a diagram illustrating a state where a finger is in contact with or in proximity to a device to explain the basic principle of the touch detection method of the capacitance type. FIG. 5 is a diagram illustrating an example of an equivalent circuit in the state where the finger is in contact with or in proximity to the device illustrated in FIG. 4. FIG. 6 is a diagram illustrating an example of waveforms of a drive signal and a touch detection signal. In the following description, a finger is exemplified as an approaching object. However, the approaching object is not limited to a finger and may be a position indication device such as a stylus pen.

For example, as illustrated in FIG. 2, a capacitive element C1 includes a pair of electrodes, a drive electrode E1 and a touch detection electrode E2 that are arranged so as to face each other with a dielectric D interposed therebetween. As illustrated in FIG. 3, the capacitive element C1 is coupled at one end to an alternating signal source (drive signal source) S and is coupled at the other end to a voltage detector (touch detection unit) DET. The voltage detector DET is an integration circuit included in, for example, the touch detection signal amplification unit 42 illustrated in FIG. 1.

When the alternating signal source S applies an alternating rectangular wave Sg at a predetermined frequency (for example, approximately several kHz to several hundreds kHz) to the drive electrode E1 (one end of the capacitive element C1), such an output waveform (the detection signal Vr) as illustrated in FIG. 6 appears via the voltage detector DET coupled to the touch detection electrode E2 (the other end of the capacitive element C1) side. The alternating rectangular wave Sg corresponds to the drive signal Vt input from the drive electrode driver 14.

In a state where a finger is not in contact with (or not in proximity to) a device (a non-contact state), current $I_0$ according to a capacitance value of the capacitive element C1 flows in accordance with charging or discharging of the capacitive element C1 as illustrated in FIGS. 2 and 3. The voltage detector DET illustrated in FIG. 3 converts a change in the current $I_0$ according to the alternating rectangular wave Sg into a change in voltage (a waveform $V_0$ of the solid line (refer to FIG. 6)).

On the other hand, in a state where a finger is in contact with (or in proximity to) a device (a contact state), as illustrated in FIG. 4, capacitance C2 formed by the finger is in contact with or in proximity to the touch detection electrode E2. Accordingly, fringe capacitance between the drive electrode E1 and the touch detection electrode E2 is blocked, and a capacitive element C1' with a smaller capacitance value than that of the capacitive element C1 is generated. When viewed in the equivalent circuit illustrated in FIG. 5, current $I_1$ flows in the capacitive element C1'. As illustrated in FIG. 6, the voltage detector DET converts a change in the current $I_1$ in accordance with the alternating rectangular wave Sg into a change in voltage (a waveform $V_1$ of the dotted line). In this case, the waveform $V_1$ is reduced in amplitude as compared to the above-mentioned waveform $V_0$. Consequently, an absolute value $|\Delta V|$ of a difference in voltage between the waveform $V_0$ and the waveform $V_1$ is changed according to influence by an object approaching from the outside, such as a finger. It is more preferable that the voltage detector DET operates with a period Reset where charging or discharging of a capacitor is reset by switching in the circuit in accordance with the frequency of the alternating rectangular wave Sg in order to accurately detect the absolute value $|\Delta V|$ of a difference in voltage between the waveform $V_0$ and the waveform $V_1$.

The touch detection unit 30 illustrated in FIG. 1 is configured to sequentially scan drive regions described below in response to the drive signals Vt supplied from the drive electrode driver 14 to detect a touch.

The touch detection unit 30 is configured to output the touch detection signals Vr by detection block basis from a plurality of detection electrodes 34 described below via the voltage detector DET illustrated in FIG. 3 or 5 to supply the touch detection signals Vr to the touch detection signal amplification unit 42 of the touch detection signal processing unit 40.

The A/D conversion unit 43 samples an analog signal output from the touch detection signal amplification unit 42 at timing synchronized with the drive signal Vt to convert the analog signal into a digital signal.

The signal processing unit 44 includes a digital filter that reduces a frequency component (noise component), other than a frequency at which the detection signal Vr is sampled, included in the output signal of the A/D conversion unit 43. The signal processing unit 44 detects the presence or absence of a touch on the touch detection unit 30 based on the output signal of the A/D conversion unit 43. The signal processing unit 44 performs a process of extracting only the difference in voltage caused by the finger. The difference in voltage caused by the finger is the above-mentioned absolute value $|\Delta V|$ of the difference between the waveform $V_0$ and waveform $V_1$. The signal processing unit 44 may perform an operation of averaging the absolute value $|\Delta V|$ per one drive region to obtain the average of the absolute values $|\Delta V|$. Consequently, the signal processing unit 44 can reduce the influence of the noise. The signal processing unit 44 compares the detected difference in voltage caused by the finger with a predetermined threshold voltage. If the difference in voltage is equal to or more than the threshold voltage, the signal processing unit 44 determines that the external nearby object is in the contact state. On the other hand, if the difference in voltage is less than the threshold voltage, the signal processing unit 44 determines that the external proximity object is in the non-contact state. Consequently, the touch detection signal processing unit 40 can detect a touch.

Figure 7:
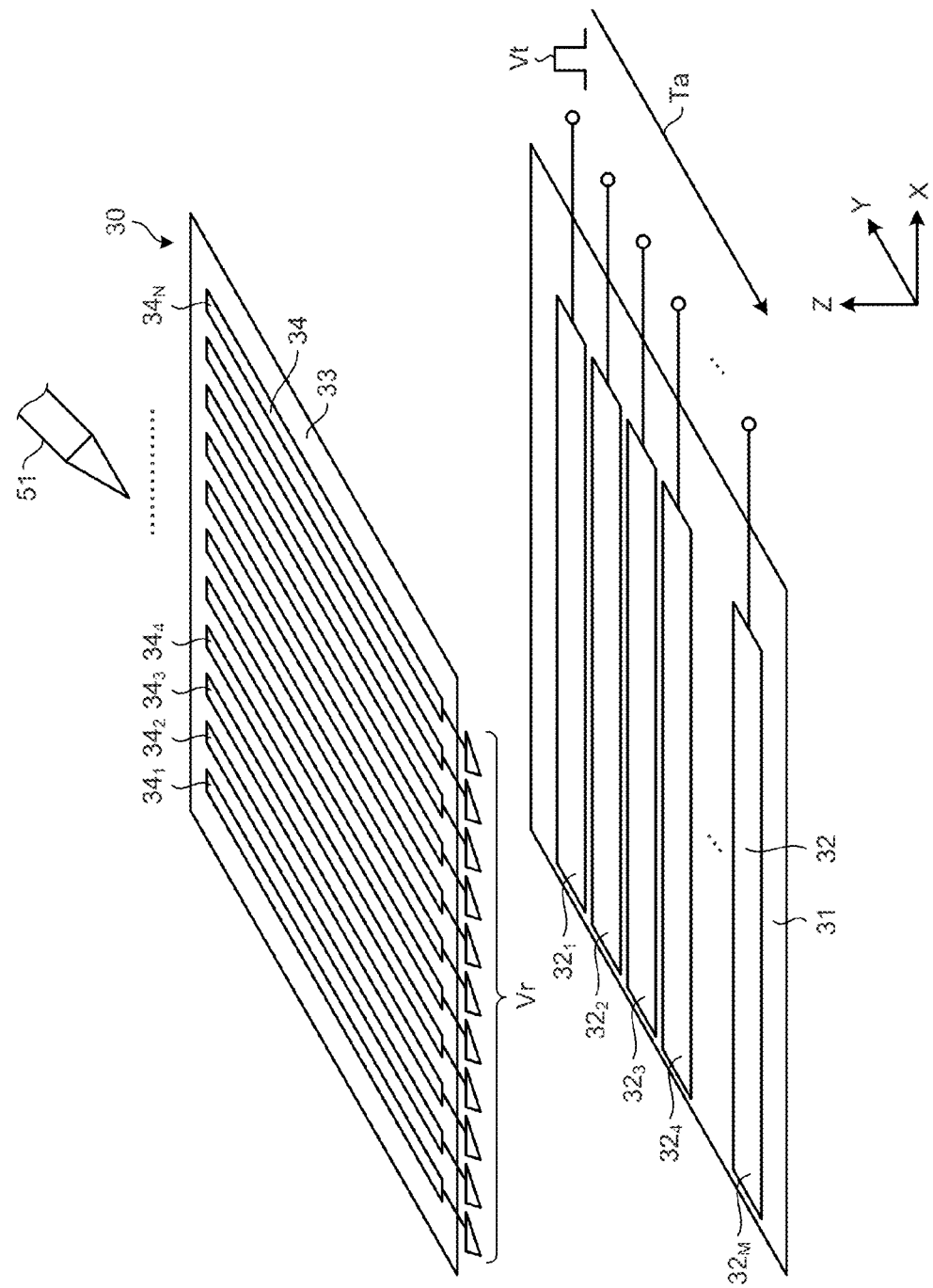
FIG. 7 is an exploded perspective view illustrating a touch detection unit of the touch detection device according to the embodiment.

FIG. 7 is a perspective view illustrating the touch detection unit of the touch detection device according to the embodiment. As illustrated in FIG. 7, the touch detection unit 30 includes drive electrodes 32 and the detection electrodes 34. The drive electrodes 32 are provided on a first substrate 31. The detection electrodes 34 are provided on a second substrate 33. The drive electrodes 32 and the detection electrodes 34 are made of a translucent conductive material such as ITO (Indium Tin Oxide). The first substrate 31 and the second substrate 33 are made of glass or resin substrates. The drive electrodes 32 extend in the X direction. A plurality of drive electrodes $32_m$ (m=1, 2 . . . M) are arranged at an interval in the Y direction. The detection electrodes 34 extend in the Y direction that is a direction intersecting with the direction in which the drive electrodes 32 extend. The detection electrodes $34_n$ (n=1, 2 . . . N) are arranged at an interval in the X direction. Capacitance is formed at intersections of the drive electrodes 32 and the detection electrodes 34. The drive electrodes 32 are provided on a different substrate from that of the detection electrodes 34 in FIG. 7. However, the configuration is not limited thereto. For example, the detection electrodes 34 may be provided on one side of a substrate and the drive electrodes 32 on the other side thereof.

The touch detection unit 30 outputs the detection signals Vr from the detection electrodes 34 by the drive electrode driver 14 sequentially applying the drive signals Vt to the drive electrodes $32_m$ (m=1, 2 . . . M). A scanning direction Ta of the drive signal Vt is a direction in which the drive electrodes $32_m$ are arranged (−Y direction). When an operator performs the input operation and brings the position indication device 51 such as a stylus pen or the finger into contact with or close to the touch detection unit 30, the capacitance formed by the position indication device 51, the detection electrode 34, and the like is added to the capacitance formed between the drive electrode 32 and the detection electrode 34. Consequently, the detection signal Vr is changed, and it becomes possible to detect the input position.

Figure 8:
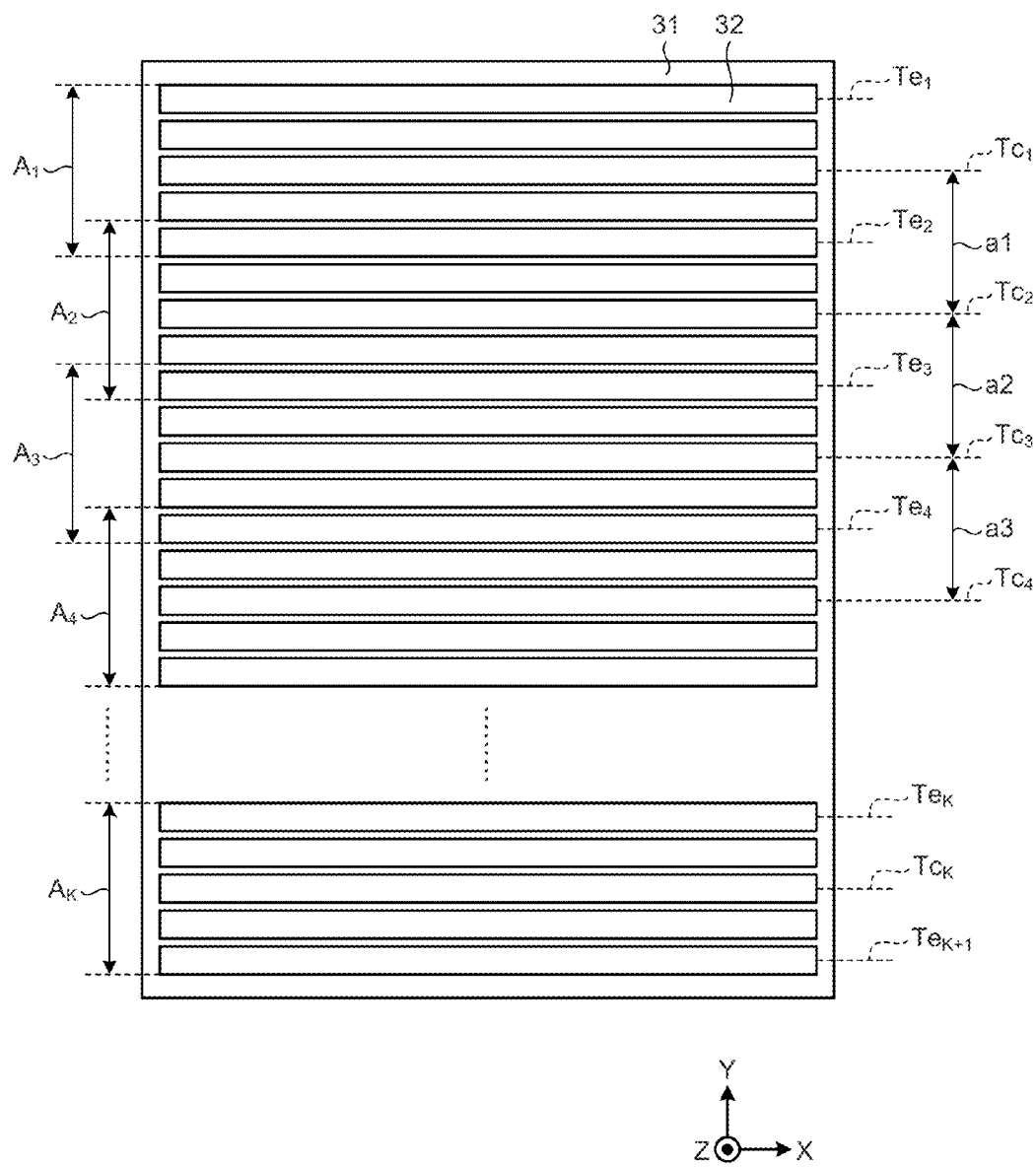
FIG. 8 is a schematic plan view explaining an operation example of driving and scanning of the touch detection unit.

Next, methods for causing the touch detection unit 30 to apply the drive signal Vt and perform scanning will be described. FIG. 8 is a schematic plan view explaining an operation example of driving and scanning of the touch detection unit. As illustrated in FIG. 8, the drive electrodes 32 are formed with the same width and arranged side by side. The drive electrode driver 14 (refer to FIG. 1) simultaneously drives a predetermined number of the drive electrodes 32 (e.g., a drive range $A_1$). A region corresponding to the predetermined number of the drive electrodes 32 is a touch detection region on a touch detection surface when the drive electrode driver 14 simultaneously drives the predetermined number of the drive electrodes 32. In other words, the width of the touch detection region (the length in the Y direction) is the same as that of the drive range $A_1$. In the touch detection unit 30, the drive signal Vt applied to the predetermined number of the drive electrodes 32 is transmitted to the detection electrodes 34 (refer to FIG. 7) via the capacitance, and thus is output as the detection signals Vr.

The drive electrode driver 14 (refer to FIG. 1) drives and scans the drive electrodes 32 in a time-division manner in the order of the drive ranges $A_1, A_2, A_3, A_4 \ldots A_K$. In the embodiment, the drive electrode driver 14 performs driving and scanning at scanning pitches a1, a2, a3 . . . that are smaller than the width of the drive electrode 32's drive range $A_k$ (k=1, 2 . . . K). In this example, the scanning pitches a1, a2, a3 . . . are the same scanning pitch (hereinafter referred to as the scanning pitch a). The drive electrode driver 14 drives five drive electrodes 32 simultaneously, and scans the driven drive electrodes 32 by shifting drive electrodes 32 by four (the scanning pitch a). One or a plurality of drive electrodes 32 are driven in the drive range $A_k$ and the drive range $A_{k+1}$, which are adjacent to and overlap with each other.

Figure 9:
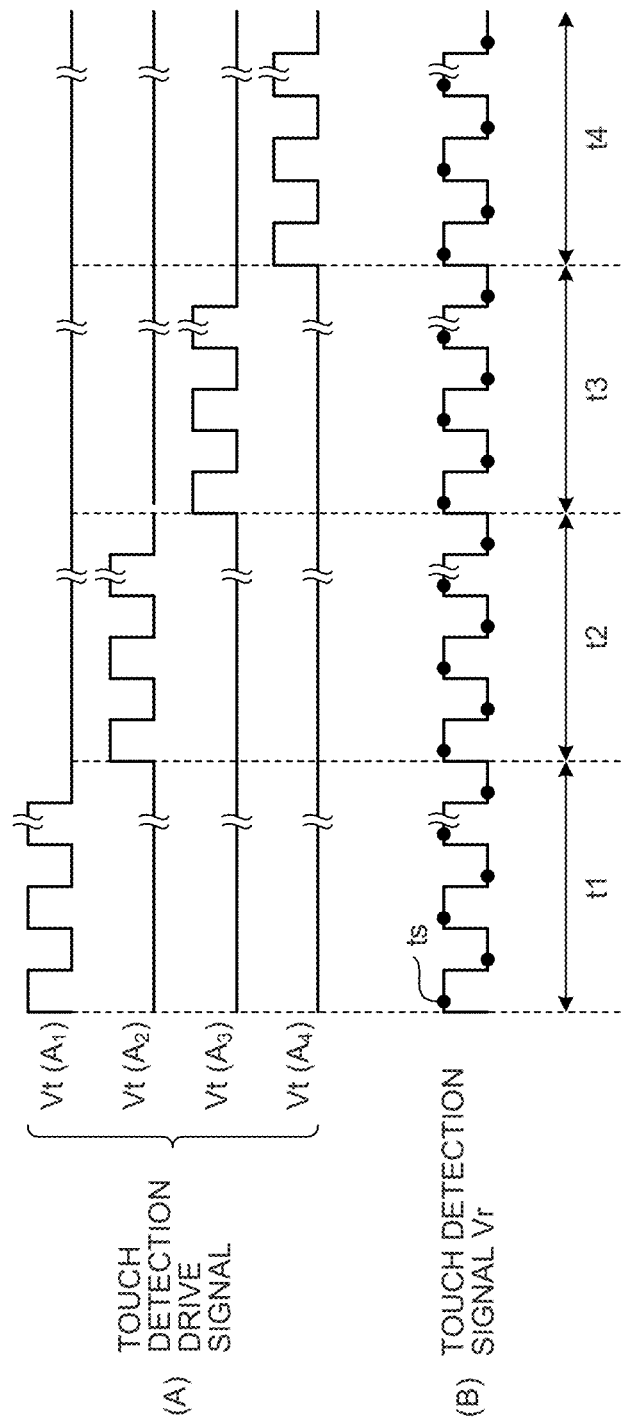
FIG. 9 is a timing waveform diagram illustrating an operation example of the touch detection device.

FIG. 9 is a timing waveform diagram illustrating operation example of the touch detection device 1. FIG. 9(A) illustrates the waveform of the drive signal Vt. FIG. 9(B) illustrates the waveform of the detection signal Vr.

The drive electrode driver 14 applies the drive signal Vt having a waveform of a plurality of pulses to the drive electrodes 32 of each drive range $A_k$ (k=1, 2 . . . K) in a time-division manner (FIG. 9(A)). The touch detection unit 30 outputs a signal based on the drive signal Vt as the detection signal Vr (FIG. 9(B)). The touch detection signal processing unit 40 then analyzes the detection signals Vr of the drive range $A_k$ (k=1, 2 . . . K) separately to detect the presence or absence of a touch and the touch position.

Specifically, in a period t1, the drive electrode driver 14 applies the drive signal Vt having the waveform of the plurality of pulses to the drive electrodes 32 corresponding to the drive range $A_1$ (Vt ($A_1$) of FIG. 9(A)). In the touch detection unit 30, the drive signal Vt is transmitted to the detection electrode 34 via the capacitance between the drive electrodes 32 corresponding to the drive range $A_1$ and the detection electrode 34. Accordingly, the detection signal Vr is changed (FIG. 9(B)). The A/D conversion unit 43 of the touch detection signal processing unit 40 samples an output signal of the touch detection signal amplification unit 42 into which the detection signal Vr has been input at sampling timing corresponding to transitions in the waveform of the plurality of pulses of the drive signal Vt (FIG. 9(B)) to convert the output signal from analog to digital. The signal processing unit 44 detects the presence or absence of a touch in a region corresponding to the drive range $A_1$ based on a plurality of A/D conversion results. In periods t2, t3, t4 . . . , driving and scanning is performed in the drive ranges $A_2, A_3, A_4$, respectively, to perform detection likewise.

The scanning pitch a has a correlation with the position resolution upon detection of a touch position. In other words, it is generally possible to increase the position resolution when the scanning pitch a is reduced. On the other hand, the drive range $A_k$ (k=1, 2 . . . K) has a correlation with the detection sensitivity to a touch. It is generally possible to increase the detection sensitivity when the drive range $A_k$ (k=1, 2 . . . K) is increased. This is because when the area of the drive range $A_k$ (k=1, 2 . . . K) is increased, the number of lines of electric force from the drive electrodes 32 is increased.

In the touch detection device 1, the scanning pitch a and the drive range $A_k$ (k=1, 2 . . . K) can be set independently, and thus the position resolution and the detection sensitivity can be set independently. For example, in order to increase the position resolution while maintaining the detection sensitivity, the scanning pitch a should be reduced while the width of the drive range $A_k$ (k=1, 2 . . . K) is maintained. On the other hand, in order to increase the detection sensitivity while maintaining the position resolution, for example, the width of the drive range $A_k$ (k=1, 2 . . . K) should be increased while the scanning pitch a is maintained. In order to increase both of the position resolution and the detection sensitivity, for example, the width of the drive range $A_k$ (k=1, 2 . . . K) should be increased and also the scanning pitch a should be reduced.

In the embodiment, it is possible to increase the position resolution in the direction in which the drive electrodes 32 are arranged (the Y direction) and to prevent a reduction in detection accuracy, by sequentially and time-divisionally selecting the predetermined number of the drive electrodes 32 to which the drive signals Vt are to be applied, and driving and scanning the drive electrodes 32 at the scanning pitch a that is smaller than the total width of the selected drive electrodes 32 (the width of the drive range $A_k$ (k=1, 2 . . . K).

Figure 10:
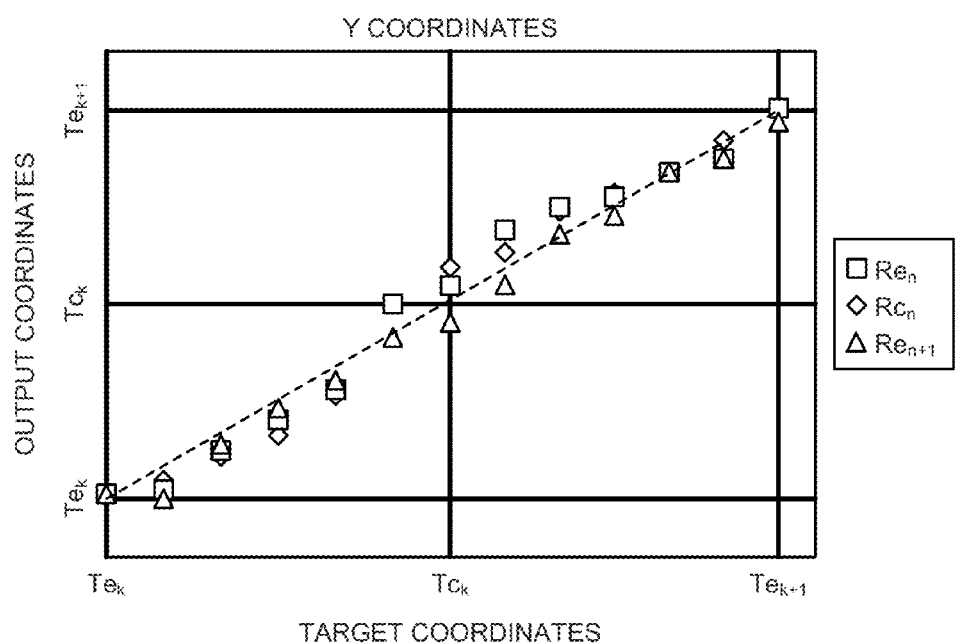
FIG. 10 is a graph schematically illustrating the relationship between an input position and a detection position in the Y direction.
Figure 11:
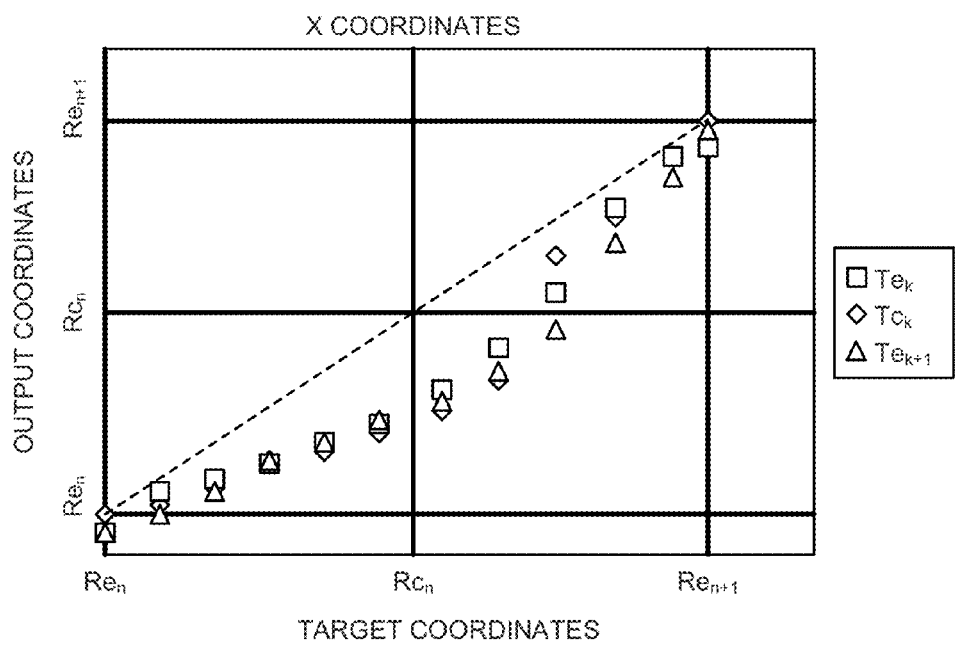
FIG. 11 is a graph schematically illustrating the relationship between the input position and the detection position in the X direction.

FIG. 10 is a graph schematically illustrating the relationship between an input position and a detection position in the Y direction. FIG. 11 is a graph schematically illustrating the relationship between the input position and the detection position in the X direction. The input positions illustrated on the horizontal axes of FIGS. 10 and 11 indicate the positions at which an external object such as the position indication device 51 (refer to FIG. 7) is in proximity to or in contact with the touch detection surface. The detection positions on the vertical axes indicate the positions that are calculated by the coordinate extraction unit 45 based on the detection signal Vr generated by the external object being in proximity to or contact with the touch detection surface. The dotted lines illustrated in FIGS. 10 and 11 indicate ideal lines where the input position coincides with the detection position.

Regarding the drive electrodes 32, assume that the central position of each drive range $A_k$ (k=1, 2 . . . K) in the driving and scanning direction (the Y direction) is a drive range center $Tc_k$ (k=1, 2 . . . K), as illustrated in FIG. 8. Also assume that the central position between a drive range center $Tc_{k-1}$ of a drive range $A_{k-1}$ adjacent in the +Y direction to the drive range $A_k$ and the drive range center $Tc_k$ of the drive range $A_k$ is a first drive range end $Te_k$. Further, assume that the central position between a drive range center $Tc_{k+1}$ of a drive range $A_{k+1}$ adjacent in the −Y direction to the drive range $A_k$ and the drive range center $Tc_k$ is a second drive range end $Te_{k+1}$.

Figure 12:
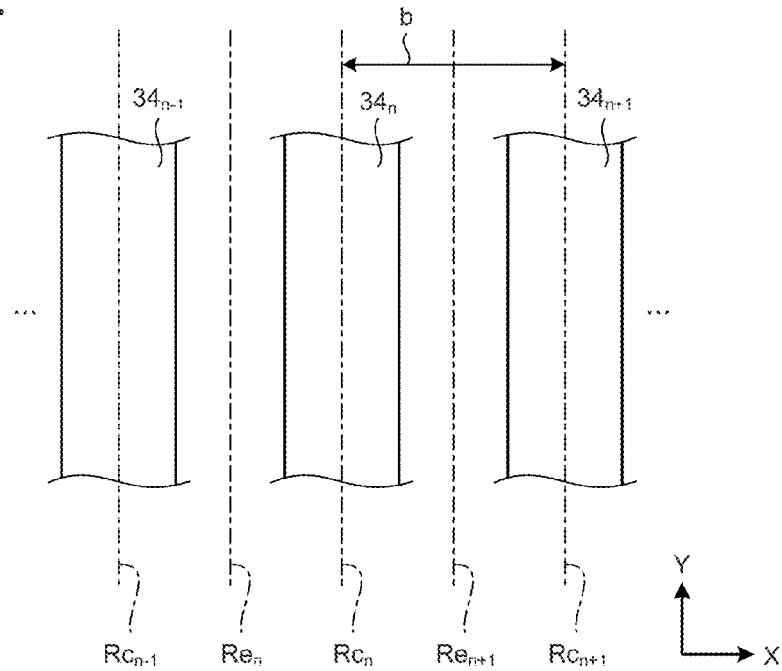
FIG. 12 is a partially enlarged plan view illustrating enlarged detection electrodes.

FIG. 12 is a partially enlarged plan view illustrating enlarged detection electrodes. Regarding the detection electrodes $34_n$ (n=1, 2 . . . N), assume that the center of the detection electrode $34_n$ in the width direction (the X direction) is a detection range center $Rc_n$ of the detection electrode $34_n$. Also assume that the central position between a detection range center $Rc_{n-1}$ of a detection electrode $34_{n-1}$ adjacent in the −X direction to the detection electrode $34_n$ and the detection range center $Rc_n$ of the detection electrode $34_n$ is a first detection range end $Re_n$. Further, assume that the central position between a detection range center $Rc_{n+1}$ of a detection electrode $34_{n+1}$ adjacent in the +X direction to the detection electrode $34_n$ and the detection range center $Rc_n$ of the detection electrode $34_n$ is a second detection range end $Re_{n+1}$. A scanning pitch b of the detection electrode $34_n$ is equal to spacing between the detection range centers $Rc_n$ and $Rc_{n+1}$ that are adjacent to each other.

FIG. 10 illustrates the relationship between the input position of actual input and the detection position with respect to a range in the Y direction between the first drive range end $Te_k$ and the second drive range end $Te_{k+1}$. The horizontal axis represents the input position of actual input, while the vertical axis represents the detection position. FIG. 10 illustrates the relationship between the input position and the detection position in each case where the input position in the X direction is the first detection range end $Re_n$, the detection range center $Rc_n$, and the second detection range end $Re_{n+1}$. FIG. 11 illustrates the relationship between the input position of actual input and the detection position with respect to a range in the X direction between the first drive range end $Re_n$ and the second drive range end $Re_{n+1}$. The horizontal axis represents the input position of actual input, while the vertical axis represents the detection position. FIG. 11 illustrates the relationship between the input position and the detection position in each case where the input position in the Y direction is the first drive range end $Te_k$, the drive range center $Tc_k$, and the second drive range end $Te_{k+1}$.

It can be seen from FIG. 10 that the relationship between the input position and the detection position in the Y direction roughly overlaps the ideal line indicated by the dotted line, and an error between the input position and the detection position is small. In this manner, it is possible to increase the position resolution in the direction where the drive electrodes 32 are arranged (the Y direction) and to prevent a reduction in detection accuracy by performing driving and scanning at the scanning pitch a that is smaller than the drive range $A_k$ (k=1, 2 . . . K) as illustrated in FIG. 8. On the other hand, the relationship between the input position and the detection position in the X direction deviates largely from the ideal line indicated by the dotted line, as illustrated in FIG. 11. If, for example, input is given to the detection range center $Rc_n$, a position deviating toward the first detection range end $Re_n$ side is detected. FIG. 11 illustrates detection errors in the range between the first detection range end $Re_n$ and the second detection range end $Re_{n+1}$. If the input operation is performed by, for example, a finger having a large contact area, an error between the input position and the detection position may not be a problem in many cases. If the input operation is performed by the position indication device 51 such as a stylus pen that has a distal end portion of a small area for performing the input operation, an error between the input position and the detection position in the X direction may occur, and the input operation may not be executed as intended by the operator. When input is given in a state where the position indication device 51 is inclined with respect to the touch detection surface, if capacitance formed by, for example, the finger holding the position indication device 51 is detected, an error may occur in detection position.

Figure 13:
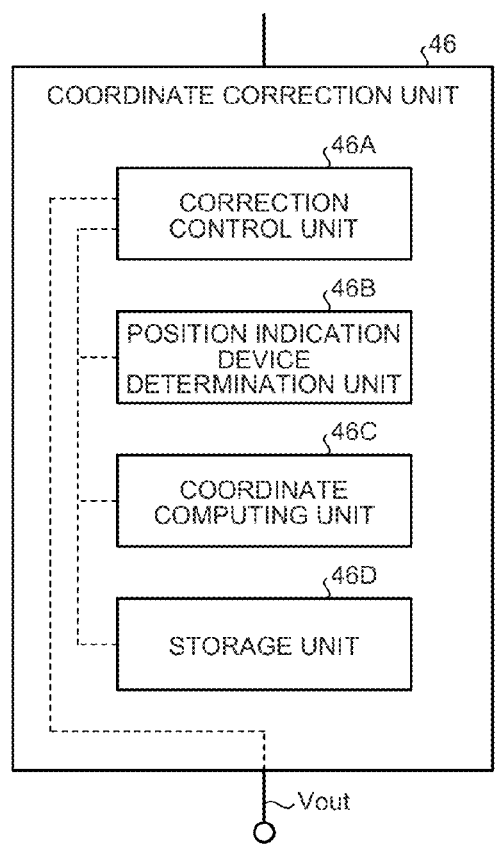
FIG. 13 is a block diagram illustrating a configuration example of a coordinate correction unit.

Next, a description will be given to a method for correcting the detection position in the direction where the drive electrodes 32 extend (the X direction). FIG. 13 is a block diagram illustrating a configuration example of the coordinate correction unit. The coordinate correction unit 46 includes a correction control unit 46A, a position indication device determination unit 46B, a coordinate computing unit 46C, and a storage unit 46D. The correction control unit 46A receives information on the coordinates of the detection position obtained by the detection signal Vr, the interpolation operation, and the like, from the coordinate extraction unit 45 illustrated in FIG. 1. The correction control unit 46A then controls the position indication device determination unit 46B, the coordinate computing unit 46C, and the storage unit 46D. The storage unit 46D is a hard disk, RAM, ROM, or the like.

The position indication device determination unit 46B determines the area of input and the inclination of the position indication device 51 based on the distribution of the detection signals Vr. The coordinate computing unit 46C corrects the detection position input from the coordinate extraction unit 45. The storage unit 46D stores information for allowing the position indication device determination unit 46B to make a determination, and correction curves as correction information for allowing the coordinate computing unit 46C to make a correction.

Figure 14:
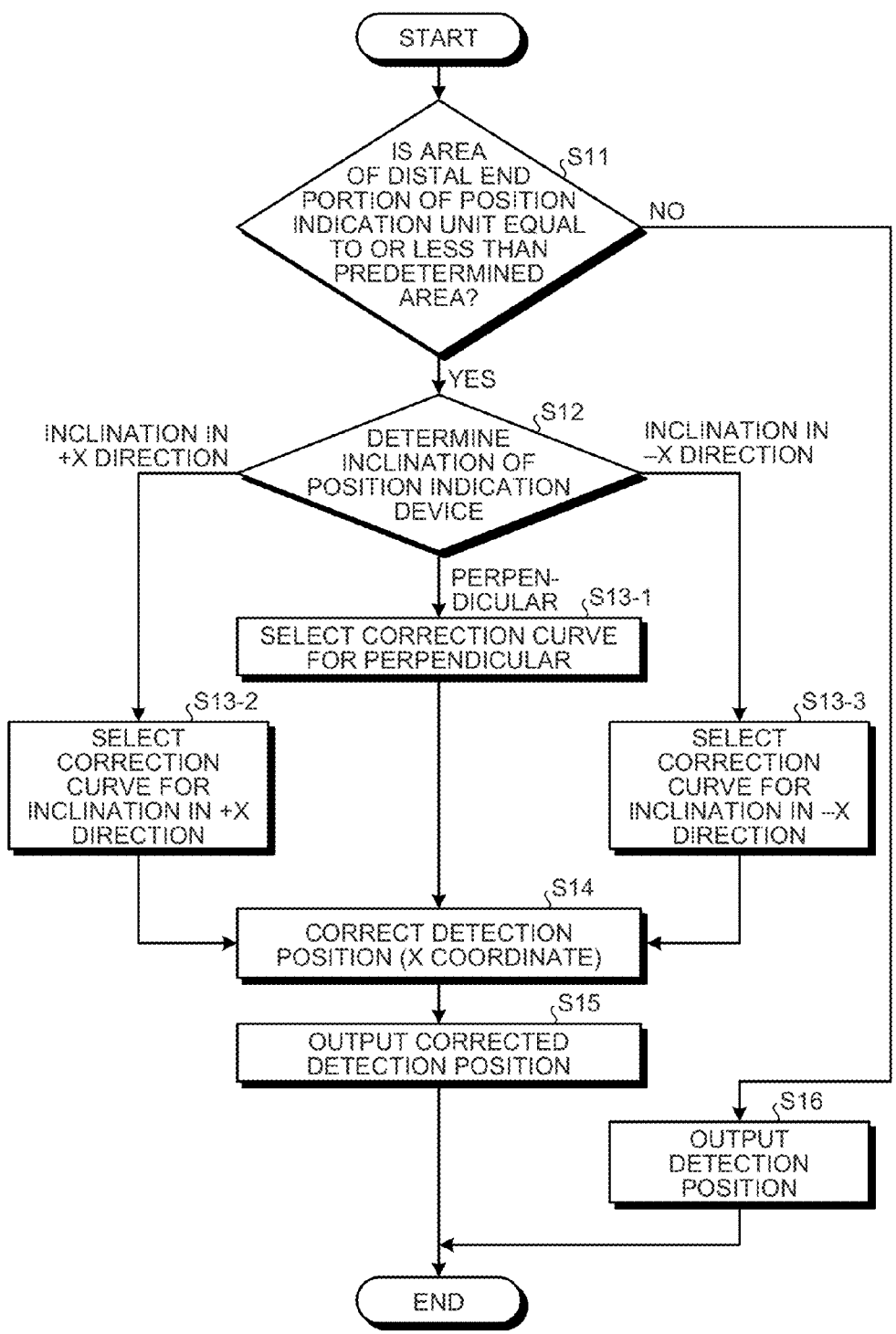
FIG. 14 is a flowchart for explaining an example of a coordinate correction method.

FIG. 14 is a flowchart for explaining an example of the coordinate correction method. When the correction control unit 46A receives information on the detection position obtained by the detection signal Vr, the interpolation operation, and the like, from the coordinate extraction unit 45 (refer to FIG. 1), the position indication device determination unit 46B receives the information of the detection signal Vr to determine whether the area of the distal end portion of a position indication unit is equal to or less than a predetermined area (Step S11). The position indication unit includes the position indication device 51 and a finger.

Figure 15:
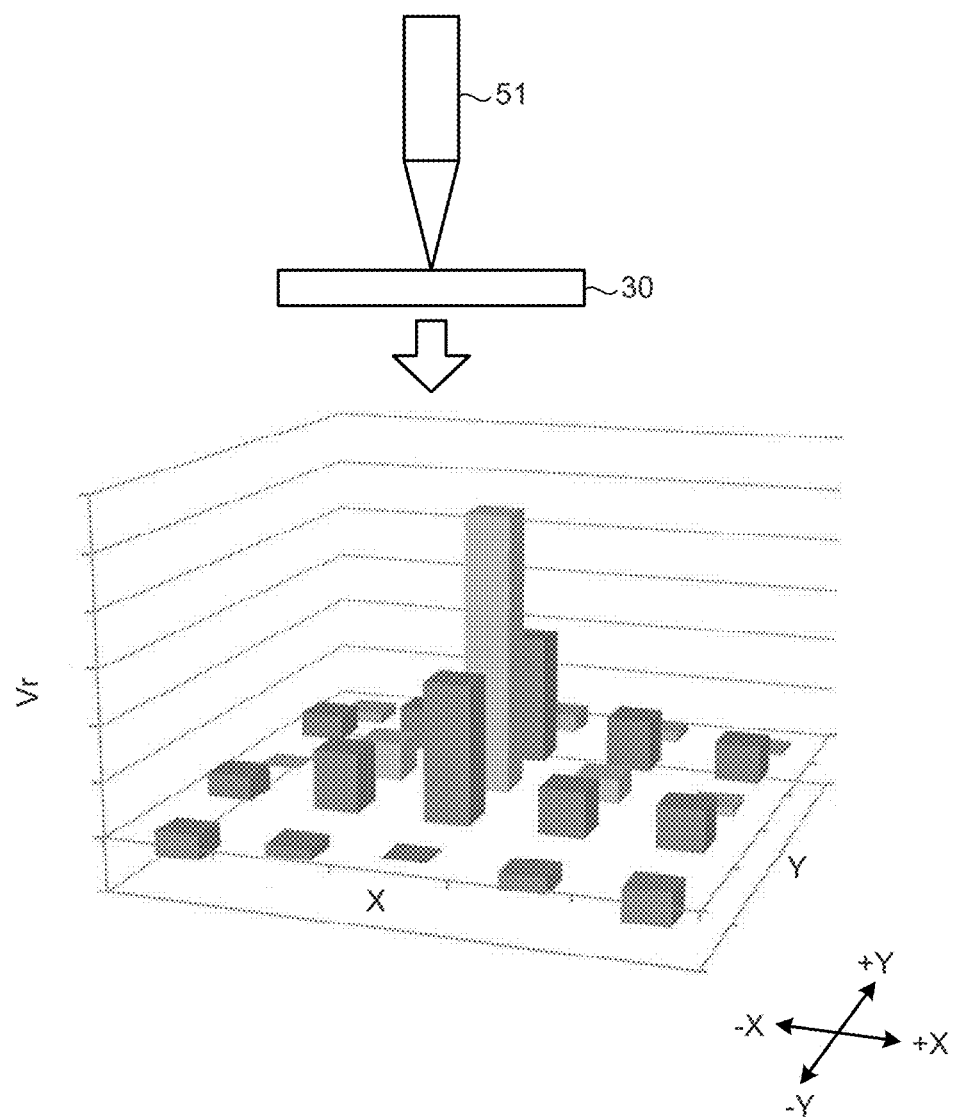
FIG. 15 is a graph schematically illustrating an example of distribution of detection signals to explain a determination on the area of a distal end portion of a position indication device.
Figure 16:
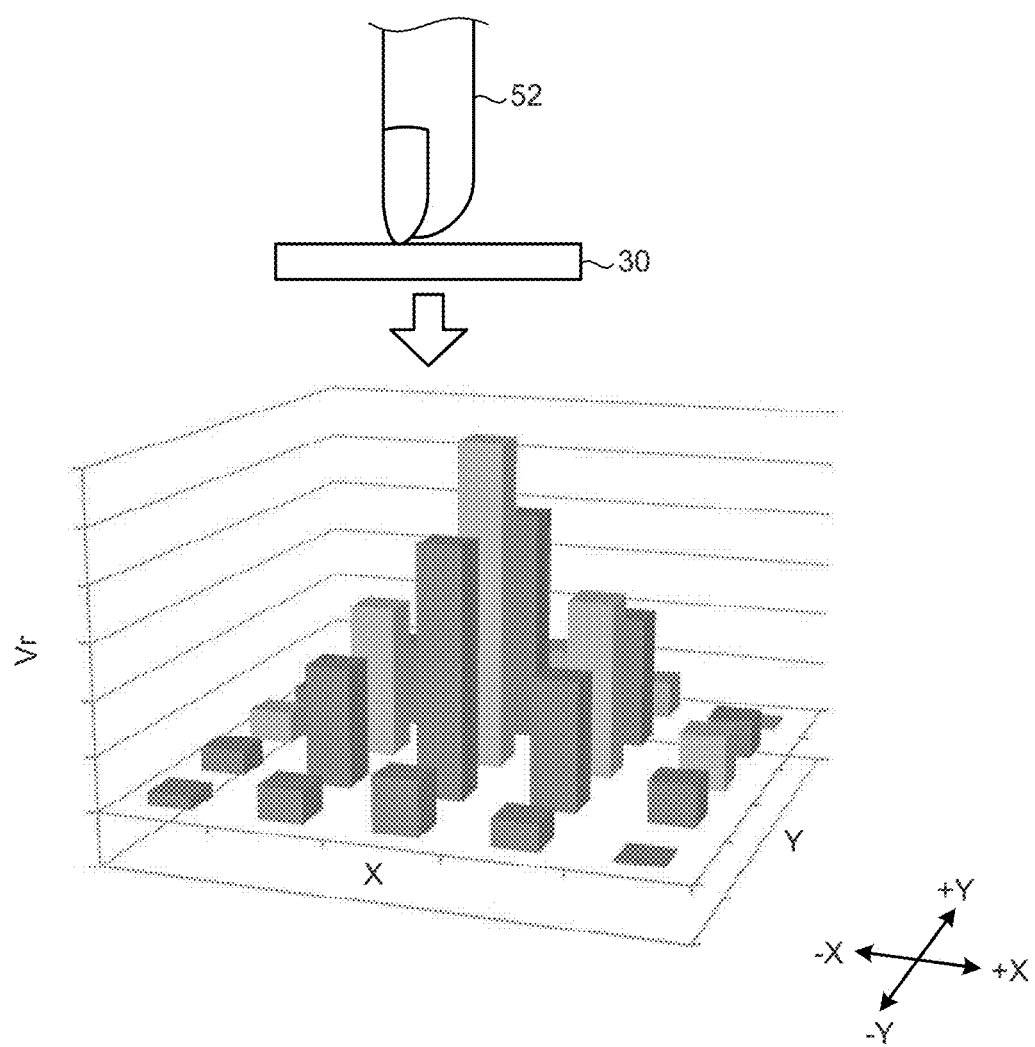
FIG. 16 is a graph schematically illustrating an example of distribution of the detection signals to explain a determination on the area of input when the input operation is performed by a finger.

FIG. 15 is a graph schematically illustrating an example of distribution of the detection signals to explain a determination on the area of the distal end portion of the position indication device. The graph illustrated in FIG. 15 illustrates a case where the input operation is performed, perpendicularly to the touch detection surface of the touch detection unit 30, by the position indication device 51. FIG. 15 illustrates distribution of the detection signals Vr at the intersections of the drive ranges $A_k$ (k=1 to K) and the detection electrodes $34_n$. FIG. 16 is a graph schematically illustrating an example of distribution of the detection signals to explain a determination on the area of input when the input operation is performed by a finger.

When the position indication device 51 having a small area at the distal end portion is used as illustrated in FIG. 15, the peak of the detection signals is outstanding. The detection signals Vr around the peak position are small. When a finger 52 or the like having a large contact area is used as illustrated in FIG. 16, the detection signals Vr around the peak position are larger than those in FIG. 15. The position indication device determination unit 46B obtains the area of a region having such distribution of the detection signals Vr that the detection signal Vr of the peak position indicates a maximum value and the detection signal Vr indicates equal to or more than a predetermined value (e.g., 50% of the maximum value of the detection signal). The position indication device determination unit 46B can obtain the area of the distal end portion of the position indication unit (the position indication device 51, a finger, or the like) from the area of the distribution of the detection signals Vr. The area of the distal end portion of the position indication unit (the position indication device 51, a finger, or the like) may be obtained as a diameter of an approximate circle which is calculated by approximating the region where the detection signal Vr indicates the predetermined value or more to a circle with the peak position at the center in the plan view.

If the area of the distal end portion of the position indication unit (the position indication device 51, a finger, or the like) is larger than the predetermined value (Step S11— No, in FIG. 14), the correction control unit 46A outputs, as an output signal Vout, the detection position calculated by the coordinate extraction unit 45 (refer to FIG. 1) without correcting the X coordinate of the detection position (Step S16). If the area of the distal end portion of the position indication device 51 is equal to or less than the predetermined value (YES in Step S11, in FIG. 14), the position indication device determination unit 46B determines the inclination of the position indication device 51 (Step S12).

A determination may be made based on whether or not the area of the distal end portion of the position indication device 51 is equal to or less than a predetermined diameter with respect to the scanning pitch b of the detection electrodes 34 when the distal end portion is approximated to a circle. When a ratio of a diameter to the scanning pitch b is equal to or less than 40%, the correction processing in Step S12 and later illustrated in FIG. 14 is performed. More preferably, the correction processing is performed when a ratio of a diameter with respect to the scanning pitch b is equal to or less than 70%.

Figure 17:
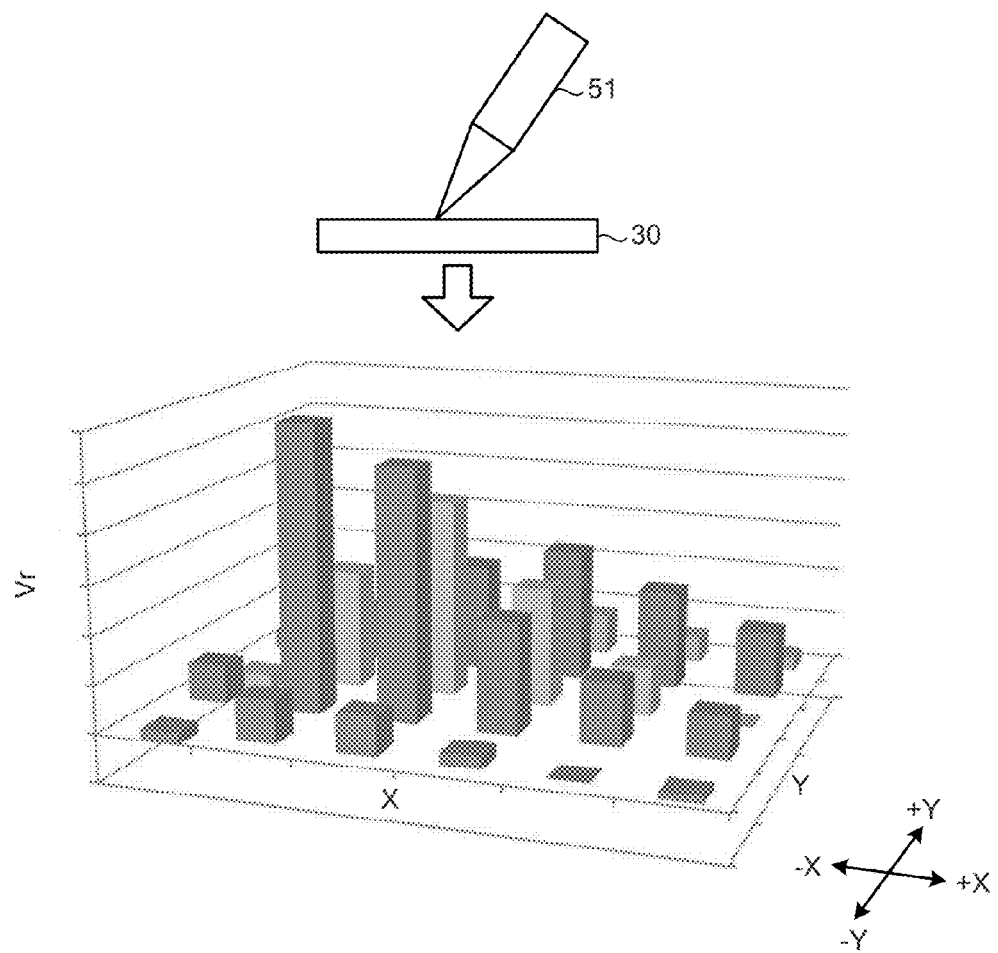
FIG. 17 is a graph schematically illustrating an example of distribution of the detection signals to explain a determination on inclination of the position indication device.
Figure 18:
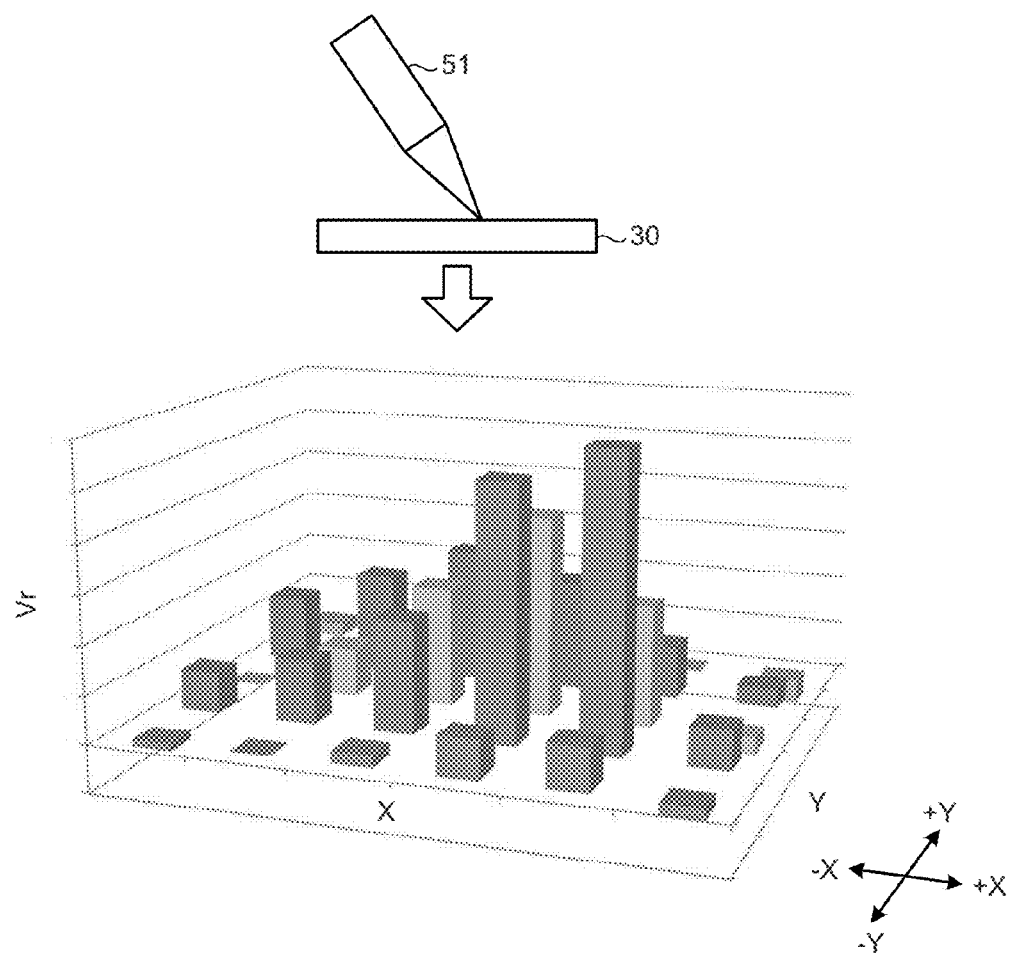
FIG. 18 is a graph schematically illustrating an example of distribution of the detection signals to explain a determination on inclination of the position indication device, which is a case where the position indication device is inclined in a direction opposite to that of FIG. 17.

FIG. 17 is a graph schematically illustrating an example of distribution of the detection signals to explain a determination on inclination of the position indication device. FIG. 18 is a graph schematically illustrating an example of distribution of the detection signals to explain a determination on inclination of the position indication device, which is a case where the position indication device is inclined in a direction opposite to that of FIG. 17.

When the input operation is performed by the position indication device 51 being substantially perpendicular to the touch detection surface of the touch detection unit 30 (refer to FIG. 15), the detection signals Vr are distributed in a substantially symmetrical manner about the peak position in the X and Y directions. As illustrated in FIG. 17, when the input operation is performed by the position indication device 51 that is inclined in the +X direction, capacitance is formed between a hand or a finger holding the position indication device 51 and the detection electrodes 34 in the +X direction with respect to the distal end portion of the position indication device 51. Therefore, the detection signals Vr are detected spreading in the +X direction from the peak position. The detection signals Vr have small values in the −X direction with respect to the peak position. As illustrated in FIG. 18, when the input operation is performed by the position indication device 51 that is inclined in the −X direction, capacitance is formed between the hand or the finger holding the position indication device 51 and the detection electrode 34 in the −X direction with respect to the distal end portion of the position indication device 51. Therefore, the detection signals Vr are detected spreading in −X direction with respect to the peak position. The detection signals Vr have small values in the +X direction with respect to the peak position. The position indication device determination unit 46B determines the inclination of the position indication device 51 based on the imbalance in the distribution of the detection signals Vr.

The storage unit 46D (refer to FIG. 13) stores in advance a plurality of correction curves, in accordance with inclination directions of the position indication device 51. If the position indication device determination unit 46B determines that the position indication device 51 is substantially perpendicular to the touch detection surface (perpendicular in Step S12), the correction control unit 46A receives the inclination information from the position indication device determination unit 46B, selects a correction curve for the perpendicular, and receives it from the storage unit 46D (Step S13-1).

If the position indication device determination unit 46B determines that the position indication device 51 is inclined in the +X direction (inclination in the +X direction in Step S12), the correction control unit 46A receives the inclination information from the position indication device determination unit 46B, selects a correction curve for the inclination in the +X direction for correcting the detection position of the coordinate extraction unit 45, and receives it from the storage unit 46D (Step S13-2). If the position indication device determination unit 46B determines that the position indication device 51 is inclined in the −X direction (the inclination in the −X direction in Step S12), the correction control unit 46A receives the inclination information from the position indication device determination unit 46B, selects a correction curve for the inclination in the −X direction, and receives it from the storage unit 46D (Step S13-3).

Figure 19:
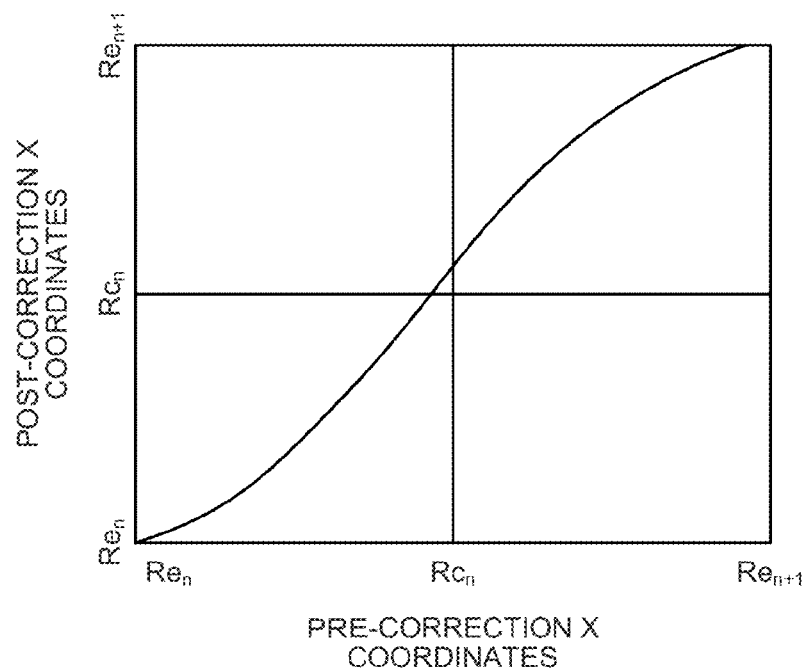
FIG. 19 is a graph illustrating an example of a correction curve when the position indication device is perpendicular to a touch detection surface.

FIG. 19 is a graph illustrating an example of a correction curve when the position indication device is substantially perpendicular to the touch detection surface. FIG. 19 illustrates the correction curve for the perpendicular. The horizontal axis represents a pre-correction X coordinate. The vertical axis represents a post-correction X coordinate. Both axes represent the X coordinates of the detection electrodes $34_n$ in the range between the first detection range end $Re_n$ and the second detection range end $Re_{n+1}$. The correction curve is obtained from a graph illustrating the relationship between the input position and the detection position in the X direction as illustrated in FIG. 11. The correction curve is created to offset an error between a detection position in the case of a given input position and the ideal line indicated by the dotted line. In the correction curve for the perpendicular illustrated in FIG. 19, if, for example, the pre-correction X coordinate of the detection position is the detection range center $Rc_n$ of the detection electrode $34_n$, the coordinate is corrected such that the post-correction X coordinate deviates from the detection range center $Rc_n$ to the second detection range end $Re_{n+1}$ side.

Figure 20:
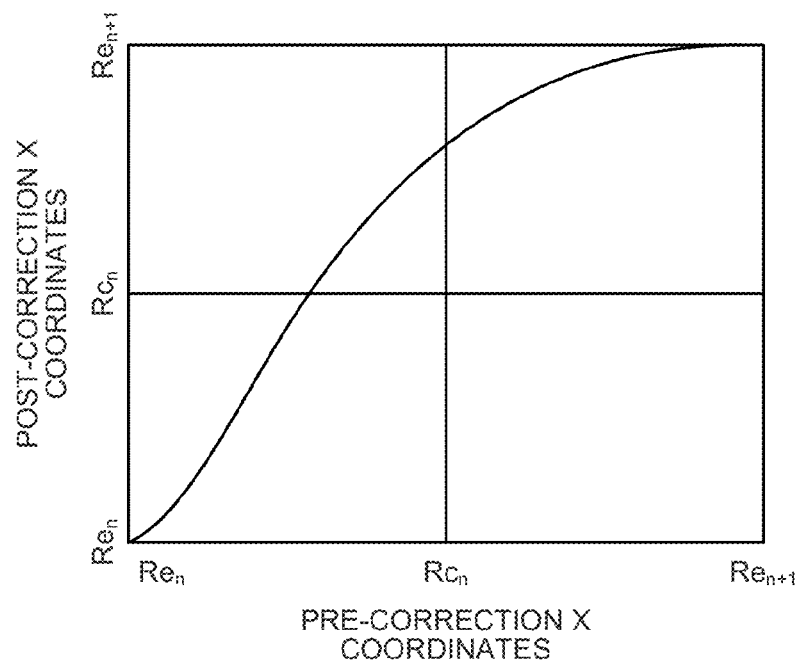
FIG. 20 is a graph illustrating an example of a correction curve when the position indication device is inclined in the +X direction.
Figure 21:
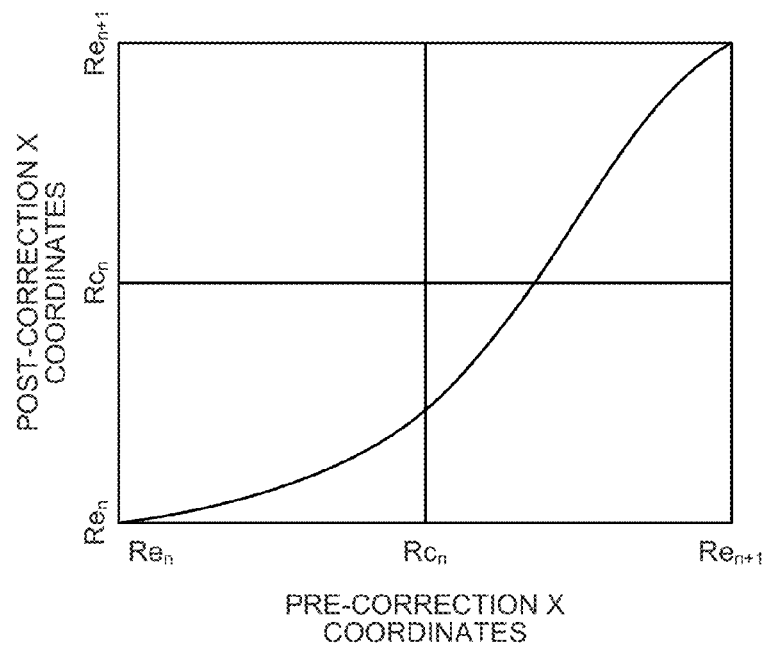
FIG. 21 is a graph illustrating an example of a correction curve when the position indication device is inclined in the −X direction.

Similarly, FIG. 20 is a graph illustrating an example of a correction curve when the position indication device is inclined in the +X direction. FIG. 21 is a graph illustrating an example of a correction curve when the position indication device is inclined in the −X direction. In both FIGS. 20 and 21, the horizontal axis represents the pre-correction X coordinate, and the vertical axis represents the post-correction X coordinate. In the correction curve for the inclination in the +X direction illustrated in FIG. 20, the correction curve is curved more largely than the correction curve for the perpendicular illustrated in FIG. 19, so that the correction amount of the X coordinate is increased. If, for example, the pre-correction X coordinate is the detection range center $Rc_n$ of the detection electrode $34_n$, the coordinate is corrected such that the post-correction X coordinate deviates largely from the detection range center $Rc_n$ to the second detection range end $Re_{n+1}$ side. The correction curve for the inclination in the −X direction illustrated in FIG. 21 has a correction curve symmetrical to the correction curve for the inclination in the +X direction illustrated in FIG. 20. If, for example, the pre-correction X coordinate is the detection range center $Rc_n$ of the detection electrode $34_n$, the coordinate is corrected such that the post-correction X coordinate deviates largely from the detection range center $Rc_n$ to the first detection range end $Re_n$ side.

As illustrated in FIG. 14, the correction control unit 46A selects a correction curve according to the inclination direction of the position indication device 51, and then corrects the X coordinate of the detection position based on the selected correction curve (Step S14). Specifically, the coordinate computing unit 46C applies, to the correction curve, the value of the X coordinate of the detection position received from the coordinate extraction unit 45 (refer to FIG. 1), and computes the post-correction X coordinate. The correction control unit 46A receives the information of the post-correction X coordinate from the coordinate computing unit 46C, and outputs the post-correction coordinate of the detection position together with the information of the Y coordinate that has not been corrected (Step S15).

As described above, according to the touch detection device 1 of the embodiment, in the direction in which the drive electrodes 32 are driven and scanned (the Y direction), the drive electrodes 32 to which the drive signals are to be applied are sequentially and time-divisionally selected on a drive range $A_k$ (k=1, 2 . . . K) basis, the drive area $A_k$ including a plurality of drive electrodes 32. Driving and scanning is then performed at the scanning pitch a that is smaller than the total width of the selected drive electrodes 32 (the width of each drive range $A_k$ (k=1, 2 . . . K). Consequently, it is possible to increase the position resolution in the direction where the drive electrodes 32 are arranged (the Y direction) and to prevent a reduction in detection accuracy.

Furthermore, in the direction where the drive electrodes 32 extend (the X direction), the coordinate correction unit 46 corrects at least the X coordinate of the detection position by using a correction curve obtained from the relationship between the input position being a position where an external object is in contact with or in proximity to the touch detection surface, and the detection position detected by the detection electrode 34. Consequently, an error between the input position and the detection position in the direction where the drive electrodes 32 extend (the X direction) is reduced, thereby preventing a reduction in detection accuracy.

The position indication device determination unit 46B determines the inclination of the position indication device 51. The correction control unit 46A selects a correction curve according to the inclination direction of the position indication device 51 to correct the coordinate. Accordingly, it is possible to reduce an error between the input position and the detection position in the direction where the drive electrodes 32 extend (the X direction) and to prevent a reduction in detection accuracy.

First Modification

Figure 22:
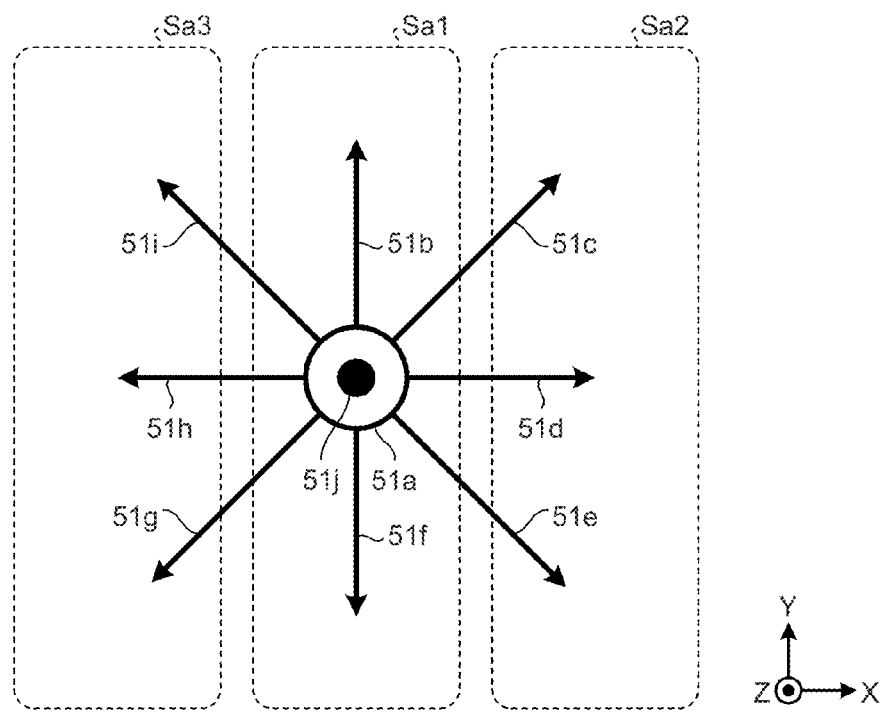
FIG. 22 is a plan view schematically illustrating inclination directions of the position indication device according to a first modification of the embodiment.
Figures 23, 24:
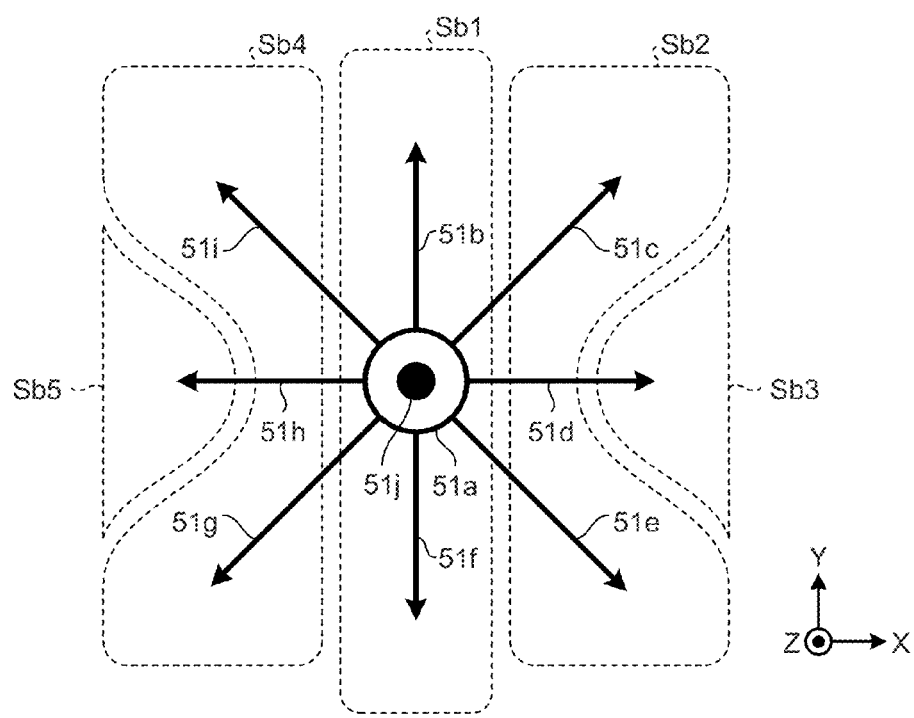
FIG. 23 is a table schematically illustrating an example of distribution of the detection signals to explain a determination on inclination of the position indication device.
FIG. 24 is a diagram schematically illustrating inclination directions of the position indication device according to a second modification of the embodiment.

FIG. 22 is a plan view schematically illustrating inclination directions of the position indication device. FIG. 23 is a table schematically illustrating an example of distribution of the detection signals to explain a determination on inclination of the position indication device. FIGS. 15, 17, and 18 illustrate examples of distribution of the detection signals when the position indication device 51 is inclined in the +X direction, is substantially perpendicular to the touch detection surface, and is inclined in the −X direction. However, when an operator actually performs the input operation, the inclination direction of the position indication device 51 is not limited to the X direction, and may be the Y direction. FIG. 22 illustrates, by arrows 51b to 51i, the inclination direction with respect to the position of a distal end portion 51j of the position indication device 51 in a view of the X-Y plane of the touch detection surface of the touch detection unit 30. A center 51a indicates a state where the position indication device 51 is substantially perpendicular to the touch detection surface. For example, the arrow 51b indicates a case where the position indication device 51 is inclined not in the X direction but in the +Y direction. The arrow 51c indicates a case where the position indication device 51 is inclined in the +X direction and also in the +Y direction.

In the embodiment, the position indication device determination unit 46B (refer to FIG. 13) divides the inclination directions of the position indication device 51 into three possible regions Sa1 to Sa3 as illustrated in FIG. 22. In the modification of the embodiment, the inclination directions fall into the region Sa1, Sa2, or Sa3 according to the magnitude of the inclination in the X direction. When the position indication device 51 is perpendicular to the touch detection surface, is inclined a little in the +X direction, or is inclined a little in the −X direction, the inclination directions fall into the region Sa1. When the position indication device 51 is inclined largely in the +X direction, or is inclined largely in the −X direction, the inclination directions fall into the regions Sa2 and Sa3, respectively. Each of the regions Sa1 to Sa3 has a substantially rectangular shape along the Y direction. Even if the position indication device 51 is inclined in the Y direction, the region into which the inclination direction of the position indication device 51 falls does not change. In the modification of the embodiment, the storage unit 46D (refer to FIG. 13) retains correction curves in accordance with the regions.

The position indication device determination unit 46B (refer to FIG. 13) determines in which region Sa1, Sa2, or Sa3, the inclination direction of the position indication device 51 falls based on the distribution of the detection signals Vr as illustrated in FIG. 23. FIG. 23 illustrates, assuming the detection range center $Rc_n$ (n=1, 2 . . . N) of the detection electrode $34_n$ as the X coordinate, and the drive range center $Tc_k$ (k=1, 2 . . . K) of the drive range $A_k$ (k=1, 2 . . . K) as the Y coordinate, the distribution of the detection signals Vr at each intersection point. $Vr_{n,k}$ illustrated in FIG. 23 indicates a value of the detection signal at coordinates $(X_n, Y_k)$.

In the modification of the embodiment, when the detection signal Vr exhibits its maximum value at a peak position $P_1$, the position indication device determination unit 46B compares the total (Vr2) of the magnitudes of the detection signals in a region $Q_2$ on the +X side with respect to the peak position $P_1$ with the total (Vr1) of the magnitudes of the detection signals in a region $Q_1$ on the −X side with respect to the peak position $P_1$. In FIG. 23, each of the regions $Q_1$ and $Q_2$ is a range including two columns in the X direction and five rows in the Y direction. However, the regions $Q_1$ and $Q_2$ are schematically illustrated in FIG. 23, and may be set as appropriate.

If the difference (Vr1−Vr2) between the total (Vr1) of the magnitudes of the detection signals Vr in the region $Q_1$ and the total (Vr2) of the magnitudes of the detection signals Vr in the region $Q_2$ is within the range of a predetermined value, that is, if the difference between Vr1 and Vr2 is small, the position indication device determination unit 46B determines that the position indication device 51 is inclined in the region Sa1. The correction control unit 46A then selects a correction curve corresponding to the region Sa1.

If the absolute value (|Vr1−Vr2|) of the difference between the total (Vr1) of the magnitudes of the detection signals Vr in the region $Q_1$ and the total (Vr2) of the magnitudes of the detection signals Vr in the region $Q_2$ is larger than the predetermined value, and Vr1>Vr2 is satisfied, the position indication device determination unit 46B determines that the position indication device 51 is inclined in the region Sa3. The correction control unit 46A then selects a correction curve corresponding to the region Sa3. If the absolute value of the difference (|Vr1−Vr2|) is larger than the predetermined value, and Vr2>Vr1 is satisfied, the position indication device determination unit 46B determines that the position indication device 51 is inclined in the region Sa2. The correction control unit 46A then selects a correction curve corresponding to the region Sa2.

As described above, the position indication device determination unit 46B can determine the inclination of the position indication device 51 more accurately based on the distribution in the XY coordinate system including the distribution of the detection signals Vr in the Y direction.

The method for determining the inclination of the position indication device 51 based on the distribution of the detection signals Vr is not limited to the above method. The method may be as follows: a region $P_2$ of a predetermined area with the peak position $P_1$ at the center is set; the total (Vr1') of the magnitudes of the detection signals Vr is obtained for a part of the region $Q_1$ that does not overlap with the region $P_2$; the total (Vr2') of the magnitudes of the detection signals Vr is obtained for a part of the region $Q_2$ that does not overlap with the region $P_2$. The position indication device determination unit 46B determines the inclination of the position indication device 51 based on the difference between the detection signals in the region $Q_1$ and the detection signals in the region $Q_2$ (Vr1'−Vr2'). In this manner, it is possible to suppress an error in the total value of the detection signals Vr due to the deviation of the peak position $P_1$ or the like, and improve accuracy of the inclination determination by determining the inclination of the position indication device 51 excluding the region $P_2$ near the peak position $P_1$.

Second Modification

FIG. 24 is a diagram schematically illustrating inclination directions of the position indication device 51 according to a second modification of the embodiment. In the first modification, the inclination directions of the position indication device 51 are divided into the three possible regions Sa1 to Sa3 depending on the inclination in the X direction as illustrated in FIG. 22. However, the regions may be divided depending on the inclination in the Y direction. As illustrated in FIG. 24, when the position indication device 51 is substantially perpendicular to the touch detection surface, which is indicated by the center 51a, is inclined a little in the X direction and is also inclined in the +Y direction (the arrow 51b), and is inclined in the −Y direction (the arrow 51f), the inclination position of the position indication device 51 falls in a region Sb1. When the position indication device 51 is inclined in a direction of 45° relative to the X and Y axes, on the +X side with respect to the region Sb1 (the arrows 51c and 51e), the inclination position of the position indication device 51 falls in a region Sb2.

Furthermore, when the inclination of the position indication device 51 is large in the +X direction and is relatively small in the Y direction, the inclination direction of the position indication device 51 falls in a region Sb3. Similarly, also on the −X side with respect to the region Sb1, the inclination directions are divided into regions Sb4 and Sb5. In this manner, the inclination directions of the position indication device 51 are divided into five regions Sb1 to Sb5 depending mainly on the inclination in the X direction in a view of the X-Y plane of the touch detection surface of the touch detection unit 30. When the position indication device 51 is substantially perpendicular to the touch detection surface, the inclination direction falls in the region Sb1. In the modification, the storage unit 46D (refer to FIG. 13) retains five types of correction curves corresponding to the regions Sb1 to Sb5.

In this case, when the inclination direction is obtained from the distribution of the detection signals Vr illustrated in FIG. 23, each of the regions $Q_1$ and $Q_2$ is divided into two in the Y direction to obtain the inclination in the Y direction in the region $Q_1$, or the inclination in the Y direction in the region $Q_2$. In this manner, the position indication device determination unit 46B determines which of the regions Sb1 to Sb5 is applicable to the inclination direction of the position indication device 51. The correction control unit 46A selects a correction curve corresponding to the determined region among the regions Sb1 to Sb5. Consequently, it is possible to correct an error in detection of the X coordinate with accuracy and to prevent a reduction in accuracy of detection.

Third Modification

Figure 25:
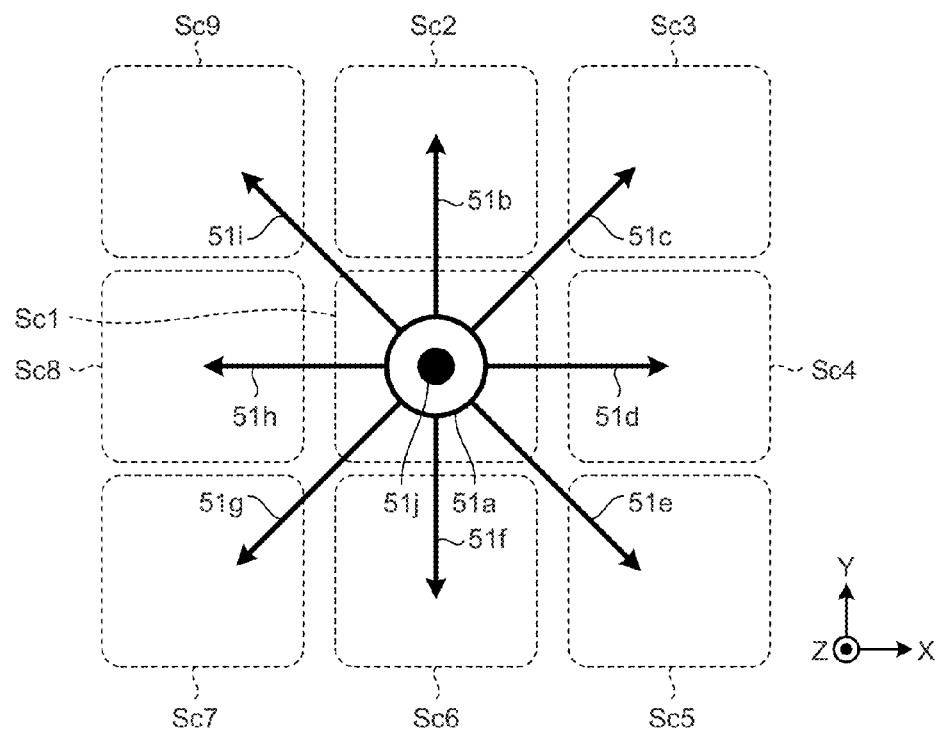
FIG. 25 is a diagram schematically illustrating inclination directions of the position indication device according to a third modification of the embodiment.

FIG. 25 is a diagram schematically illustrating inclination directions of the position indication device according to a third modification of the embodiment. In the third modification, the inclination directions of the position indication device 51 are divided into a total of nine regions Sc1 to Sc9, i.e., three in the X direction and three in the Y direction, with the distal end portion 51j of the position indication device 51 at the center. The position indication device determination unit 46B determines which of the nine regions Sc1 to Sc9 is applicable to the inclination direction of the position indication device 51. In the modification, the storage unit 46D (refer to FIG. 13) retains nine types of correction curves corresponding to the regions Sc1 to Sc9.

In this case, when the inclination direction is obtained from the distribution of the detection signals Vr illustrated in FIG. 23, the distribution of the detection signals Vr is divided into a total of nine regions, i.e., three in the X direction and three in the Y direction. A total of the detection signals Vr of each region is obtained and the obtained values are compared. In this manner, a correction curve is appropriately selected according to the inclination direction by obtaining the inclination of the position indication device 51 with accuracy. Consequently, it is possible to correct the detection position with accuracy and to prevent a reduction in detection accuracy.

(Display Device with Touch Detection Function)

Figure 26:
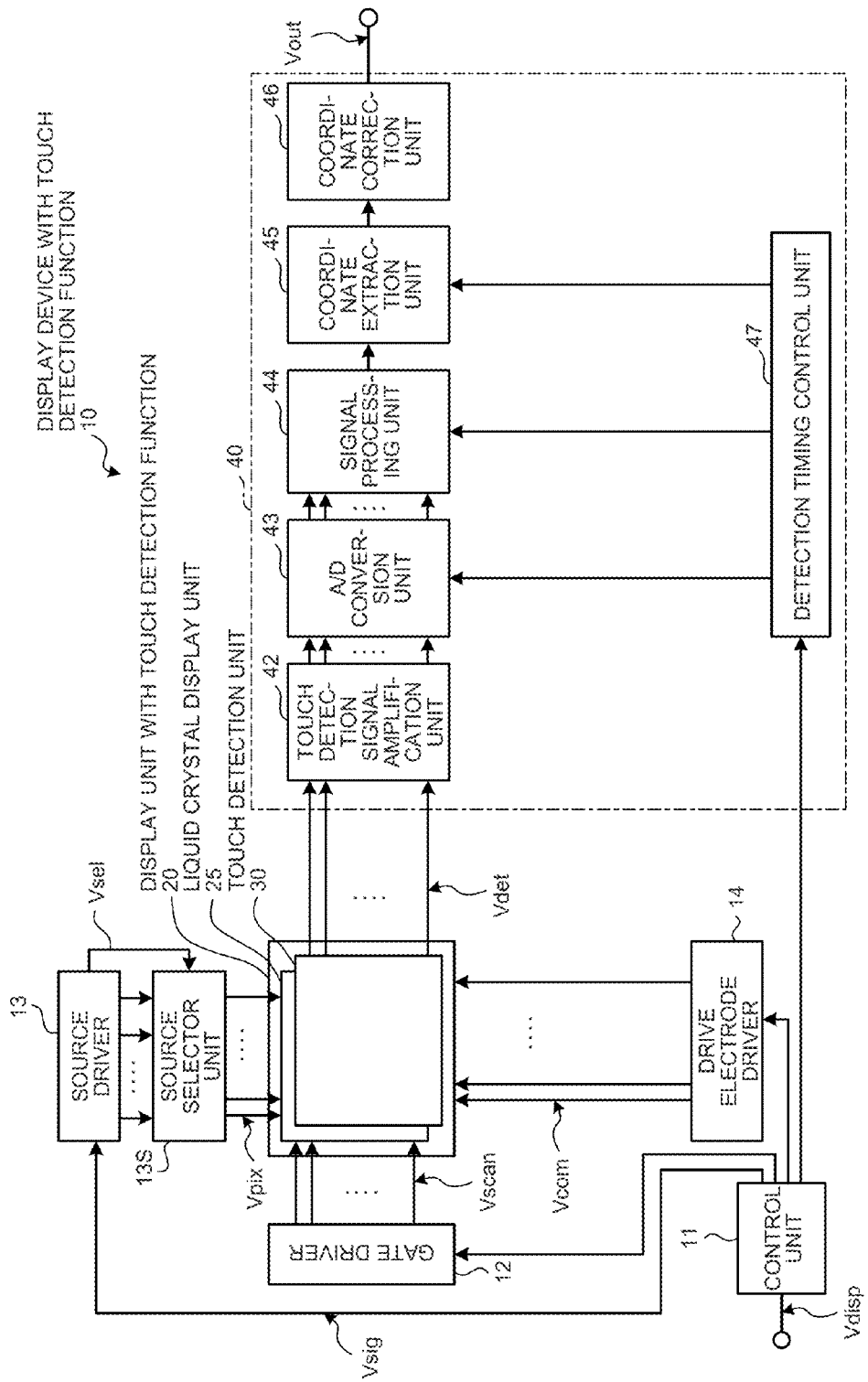
FIG. 26 is a block diagram illustrating one configuration example of a display device with a touch detection function according to the embodiment.

FIG. 26 is a block diagram illustrating one configuration example of a display device with a touch detection function according to the embodiment. A display device with a touch detection function 10 includes a display unit with a touch detection function 20, the control unit 11, a gate driver 12, a source driver 13, a source selector unit 13S, the drive electrode driver 14, and the touch detection signal processing unit 40. The display device with a touch detection function 10 is a display device in which the display unit with a touch detection function 20 includes a touch detection function. The display unit with a touch detection function 20 is what is called an in-cell type device in which a liquid crystal display unit 25 using a liquid crystal display element as a display element and the capacitive touch detection unit 30 are integrated. The display unit with a touch detection function 20 may be what is called an on-cell type device in which the capacitive touch detection unit 30 is mounted on the liquid crystal display unit 25 using the liquid crystal display element as the display element.

The liquid crystal display unit 25 is a device that sequentially scans horizontal lines one by one, in response to a scan signal Vscan supplied from the gate driver 12 to perform display. The control unit 11 is a circuit that supplies control signals to the gate driver 12, the source driver 13, the drive electrode driver 14, and the touch detection signal processing unit 40, respectively, based on a video signal Vdisp supplied from the outside to control them to operate in synchronization with one another. A control device according to the present invention includes the control unit 11, the gate driver 12, and the source driver 13, and the drive electrode driver 14.

The gate driver 12 has a function of sequentially selecting horizontal lines one by one targeted for the driving and displaying of the display unit with a touch detection function 20, based on the control signal supplied from the control unit 11.

The source driver 13 is a circuit that supplies a pixel signal Vpix to each pixel (or sub-pixel, not illustrated) of the display unit with a touch detection function 20 based on the control signal supplied from the control unit 11. The source driver 13 generates, from the video signal Vdisp of one horizontal line, pixel signals obtained by time-division multiplexing the pixel signals Vpix of a plurality of sub-pixels of the liquid crystal display unit 25 to supply the pixel signals to the source selector unit 13S. The source driver 13 generates a switch control signal Vsel necessary to separate the multiplexed pixel signals Vpix from an image signal Vsig to supply the switch control signal Vsel together with the pixel signals Vpix to the source selector unit 13S. The source selector unit 13S can reduce the number of wires between the source driver 13 and the control unit 11.

Figure 27:
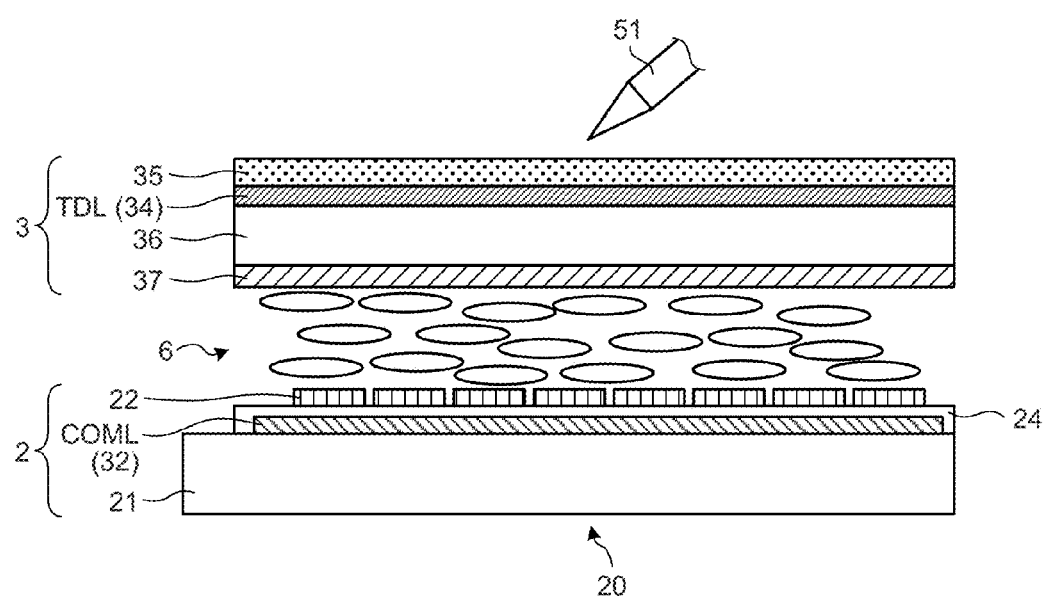
FIG. 27 is a cross-sectional view illustrating a schematic cross-sectional structure of the display device with a touch detection function according to the embodiment.

FIG. 27 is a cross-sectional view illustrating a schematic cross-sectional structure of the display device with a touch detection function according to the embodiment. As illustrated in FIG. 27, the display unit with a touch detection function 20 includes a pixel substrate 2, a counter substrate 3 disposed so as to face the pixel substrate 2 in a direction perpendicular to the surface of the pixel substrate 2, and a liquid crystal layer 6 inserted between the pixel substrate 2 and the counter substrate 3.

The liquid crystal layer 6 is configured to modulate light passing through an electric field in accordance with the state of the electric field. For example, a liquid crystal display device using liquid crystals in the horizontal electric field mode such as FFS (fringe field switching) mode or IPS (in-plane switching) mode is employed. Alignment films may be arranged respectively between the liquid crystal layer 6 and the pixel substrate 2 and between the liquid crystal layer 6 and the counter substrate 3 illustrated in FIG. 27.

The counter substrate 3 includes a glass substrate 36, and a color filter 37 formed on one side of the glass substrate 36. Touch detection electrodes TDL which are the detection electrodes 34 of the touch detection unit 30 are formed on the other side of the glass substrate 36. Furthermore, a polarizing plate 35 is provided on the touch detection electrodes TDL. The color filter 37 is configured such that three color filter layers of, for example, red (R), green (G), and blue (B) are arranged at regular intervals. A group of three colors, R, G, and B, is associated with each display pixel.

The pixel substrate 2 includes a translucent substrate 21 as a circuit board, a plurality of pixel electrodes 22 arranged in a matrix on the translucent substrate 21, a plurality of drive electrodes COML formed between the translucent substrate 21 and the pixel electrodes 22, and an insulating layer 24 that insulates the pixel electrodes 22 and the drive electrodes COML from each other. The drive electrode COML is an electrode for supplying a common potential (common potential) serving as a reference to a plurality of pixels. The drive electrode COML functions as a common drive electrode for the liquid crystal display operation, and also as the drive electrode 32 for the touch detection operation. The insulating layer 24 is formed on the drive electrodes COML. The pixel electrodes 22 are formed on the insulating layer 24.

The pixel electrode 22 is an electrode for supplying a pixel signal for display, and has translucency. The drive electrode COML and the pixel electrode 22 are made of, for example, ITO (Indium Tin Oxide). The potential difference between the voltage of the drive electrode COML and the voltage of the pixel electrode 22 generates an electric field. Within the electric field formed between the drive electrode COML and the pixel electrode 22, an electric field leaking from an opening of the pixel electrode 22 (a fringe electric field) drives the liquid crystals.

As illustrated in FIG. 27, the drive electrode COML faces the pixel electrode 22 in a direction perpendicular to the surface of the translucent substrate 21. The touch detection unit 30 includes the drive electrodes COML (32) provided to the pixel substrate 2 and the touch detection electrodes TDL (34) provided to the counter substrate 3. The touch detection electrodes TDL (34) form stripe electrode patterns extending in a direction intersecting with the direction in which the electrode patterns of the drive electrodes COML (32) extend. The touch detection electrodes TDL (34) face the drive electrodes COML (32) in the direction perpendicular to the surface of the translucent substrate 21. The electrode patterns of the touch detection electrodes TDL (34) are coupled to input terminals of the touch detection signal amplification unit 42 of the touch detection signal processing unit 40. The electrode patterns of the drive electrode COML and the touch detection electrode TDL that intersect with each other generate capacitance at the intersections. The shape of the touch detection electrodes TDL (34) or the drive electrodes COML (32) is not limited to the shape of stripes divided into a plurality of portions. For example, the touch detection electrodes TDL or the drive electrodes COML (drive electrode blocks) may be formed into a comb-like shape. Alternatively, the touch detection electrodes TDL or the drive electrodes COML (drive electrode blocks) are simply required to be divided into a plurality of portions. A slit that divides the drive electrodes COML may be formed into a straight or curved shape.

With the configuration, in the touch detection unit 30, the drive electrode driver 14 drives the drive ranges Ak (refer to FIG. 8) so as to sequentially scan them in a time-division manner upon the touch detection operation. The touch detection unit 30 then outputs a touch detection signal Vdet from the touch detection electrode TDL (34). In this manner, the touch detection unit 30 makes touch detection in one drive range Ak. Similarly to the operation example of driving and scanning illustrated in FIG. 8, in the direction in which the drive electrodes COML (32) are driven and scanned (the Y direction), the touch detection unit 30 sequentially and time-divisionally selects the drive electrodes COML (32) to which drive signals are to be applied, on a drive range $A_k$ (k=1, 2 . . . K) basis, the drive range $A_k$ including a plurality of drive electrodes COML (32). The touch detection unit 30 then performs driving and scanning at the scanning pitch a that is smaller than the width of the drive range $A_k$ (k=1, 2 . . . K). Consequently, it is possible to increase the position resolution in the direction in which the drive electrodes COML (32) are arranged (the Y direction) and to prevent a reduction in detection accuracy.

Furthermore, in the direction in which the drive electrodes COML (32) extend (the X direction), the coordinate correction unit 46 corrects at least the X coordinate of the detection position by using a correction curve obtained from the relationship between the input position at which an external object is in contact with or in proximity to the touch detection surface and the detection position detected by the touch detection electrode TDL (34). Consequently, an error between the input position and the detection position in the direction in which the drive electrodes COML (32) extend (the X direction) is reduced. Accordingly, a reduction in detection accuracy can be prevented.

In the embodiment, the touch detection unit 30 is integrated with the liquid crystal display unit 25, thereby enabling to make the display device with a touch detection function 10 compact. The configuration of the present invention is not limited to the embodiment and may be what is called an on-cell type device as described above. In this case, the common drive electrodes COML of the liquid crystal display unit 25 are provided separately from the drive electrodes 32 of the touch detection unit 30. In FIG. 27, the display unit with a touch detection function 20 is configured such that the touch detection unit and the liquid crystal display unit 25 using liquid crystals in the horizontal electric field mode such as IPS mode including FFS mode are integrated with each other. Alternatively, liquid crystals in various modes such as TN (twisted nematic) mode, VA (vertical alignment) mode, and ECB (electrically controlled birefringence) mode may be used. In this case, the drive electrodes COML and the pixel electrodes 22 are provided respectively to the pixel substrate 2 and the counter substrate 3, with the liquid crystal layer 6 interposed therebetween in the perpendicular direction.

The preferred embodiment of the present invention has been described, but the present invention is not limited to such an embodiment. The contents disclosed in the embodiment are merely examples. Various modifications can be made within the scope that does not depart from the gist of the present invention. Appropriate modifications made within the scope that does not depart from the gist of the present invention also naturally belong to the technical scope of the present invention.

For example, regarding the method for driving and scanning the drive electrodes 32, in the direction in which the drive electrodes 32 are scanned (the Y direction), correction of the Y coordinate may be performed in a similar manner to the processing illustrated in FIG. 14 by using a correction curve for the Y coordinate without performing driving and scanning at the scanning pitch a that is smaller than the width of the drive range $A_k$ as illustrated in FIG. 8.

By reducing the scanning pitch b of the detection electrodes 34, it is possible to prevent a reduction in detection accuracy without correcting the X coordinate. In this case, the number of detection electrodes 34 is increased, and the width of the detection electrode 34 and the spacing between adjacent detection electrodes 34 are reduced. For example, the scanning pitch b of the detection electrodes 34 may be substantially equal to the diameter of the distal end portion of the position indication device 51. Regarding the method for driving and scanning the drive electrodes 32, if the scanning pitch b of the detection electrodes 34 is reduced, driving and scanning may be performed at the scanning pitch a that is smaller than the width of the drive range $A_k$ as illustrated in FIG. 8. Alternatively, a correction curve for the Y coordinate may be prepared to correct the Y coordinate in a similar manner to the processing illustrated in FIG. 14. The correction information for performing a correction is not limited to the correction curves illustrated in FIGS. 19 to 21, and may be a graph linking a plurality of correction data with a straight line, a correction function that represents the correlation between the input position and the detection position, a correction table that represents the correlation between the input position and the detection position by coordinate data, and the like.

As illustrated in FIG. 8, the drive electrodes 32 each has the same width, but the configuration of the embodiment is not limited thereto. One drive range $A_k$ (k=1, 2 ... K) may include drive electrodes having different widths. If, for example, a drive electrode with a large width is included, the total number of drive electrodes is reduced. Accordingly, the configuration of the drive electrode driver 14 (refer to FIG. 1) is simplified.

In the embodiment, the liquid crystal display unit has been described as the display unit of the display device with a touch detection function 10, but the configuration of the present invention is not limited thereto. For example, the display unit of the display device with a touch detection function 10 may be an organic electro-luminescence (OEL) display, a MEMS (Micro Electro Mechanical System) display, and the like.

What is claimed is:

1. A touch detection device comprising:
a plurality of drive electrodes, each extending in a first direction;
a plurality of detection electrodes, each extending in a second direction intersecting with the first direction, so as to form capacitance at intersections with the drive electrodes;
a drive electrode driver configured to
sequentially and time-divisionally select a predetermined number of drive target electrodes to which drive signals are to be applied from the drive electrodes, and
perform driving and scanning at a scanning pitch smaller than a total width of a drive range including the selected drive target electrodes; and
a coordinate correction unit configured to use correction information obtained from a relationship between a detection position detected by a combination of the detection electrodes and the drive electrodes and an input position at which an external object is in proximity to or in contact with a touch detection surface, to correct the detection position only in the first direction without correcting the detection position in the second direction.

2. The touch detection device according to claim 1, wherein
the detection electrodes output detection signals including first detection signals that have values of a predetermined value,
the first detection signals, when an area of the distribution of the first detection signals is equal to or smaller than a predetermined area.

3. The touch detection device according to claim 1, wherein the coordinate correction unit includes a storage unit configured to store pieces of the correction information corresponding to the distribution of the detection signals output by the detection electrodes.

4. The touch detection device according to claim 3, wherein the coordinate correction unit determines an inclination direction of a position indication unit for performing an input operation based on the distribution of the detection signals, and selects the correction information corresponding to the inclination direction of the position indication unit.

5. The touch detection device according to claim 4, wherein the coordinate correction unit sets three regions obtained by dividing the touch detection surface into three in the first direction with the input position on the touch detection surface being at the center, and determines which of the three regions is applicable to the inclination direction of the position indication unit.

6. The touch detection device according to claim 4, wherein the coordinate correction unit sets five regions obtained by dividing the touch detection surface into five in the first direction with the input position on the touch detection surface being at the center, and determines which of the five regions is applicable to the inclination direction of the position indication unit.

7. The touch detection device according to claim 4, wherein the coordinate correction unit sets nine regions obtained by dividing the touch detection surface into three in the first direction and into three in the second direction with the input position on the touch detection surface being at the center, and determines which of the nine regions is applicable to the inclination direction of the position indication unit.

8. The touch detection device according to claim 1, wherein
the correction information includes a plurality of correction curves corresponding to inclination directions, and each of the correction curves describes relationships between pre-correction x-coordinates and post correction x-coordinates at a certain inclination direction.

9. The touch detection device according to claim 8, wherein
the correction curves include a first correction curve, a second correction curve, and a third correction curve,
the coordinate correction unit corrects the detection position in the first direction using:
when the inclination direction is substantially vertical to the first direction, the first correction curve;
when the inclination direction is a plus-x direction relative to the first direction, the second correction curve; and
when the inclination direction is a minus-x direction relative to the first direction, the third correction curve.

10. A display device with a touch detection function comprising:
a plurality of drive electrodes, each extending in a first direction;
a plurality of detection electrodes, each extending in a second direction intersecting with the first direction, so as to form capacitance at intersections with the drive electrodes;
a display unit configured to perform displaying based on pixel signals and display drive signals;
a drive electrode driver configured to perform
first driving and scanning to sequentially and time-divisionally apply the display drive signals to the drive electrodes, and
second driving and scanning to sequentially and time-divisionally apply drive signals for detecting proximity or contact of an external object to the drive electrodes, to sequentially and time-divisionally select a predetermined number of drive target electrodes to which the drive signals are to be applied from the drive electrodes, and to perform driving and scanning at a scanning pitch smaller than a total width of a drive range including the selected drive target electrodes; and
a coordinate correction unit configured to use correction information obtained from a relationship between a detection position detected by a combination of the detection electrodes and the drive electrodes and an input position at which an external object is in proximity to or in contact with a touch detection surface, to correct the detection position only in the first direction without correcting the detection position in the second direction.

11. A touch detection device comprising:
a plurality of drive electrodes, each extending in a first direction;
a plurality of detection electrodes, each extending in a second direction intersecting with the first direction, so as to form capacitance at intersections with the drive electrodes;
a drive electrode driver configured to
sequentially and time-divisionally select a predetermined number of drive target electrodes to which drive signals are to be applied from the drive electrodes, and
perform driving and scanning at a scanning pitch smaller than a total width of a drive range including the selected drive target electrodes; and
a coordinate correction unit including a storage unit that is configured to store pieces of correction information corresponding to a distribution of detection signals output by the detection electrodes, the coordinate correction unit being configured to
use the correction information obtained from a relationship between a detection position detected by a combination of the detection electrodes and the drive electrodes and an input position at which an external object is in proximity to or in contact with a touch detection surface,
determine an inclination direction of a position indication unit for performing an input operation, based on the distribution of the detection signals,
select the correction information corresponding to the inclination direction of the position indication unit, and
correct the detection position in the first direction.

12. The touch detection device according to claim 11, wherein
the detection electrodes output detection signals including first detection signals that have values of a predetermined value,
the first detection signals, when an area of the distribution of the first detection signals is equal to or smaller than a predetermined area.

13. The touch detection device according to claim 11, wherein the coordinate correction unit sets three regions obtained by dividing the touch detection surface into three in the first direction with the input position on the touch detection surface being at the center, and determines which of the three regions is applicable to the inclination direction of the position indication unit.

14. The touch detection device according to claim 11, wherein the coordinate correction unit sets five regions obtained by dividing the touch detection surface into five in the first direction with the input position on the touch detection surface being at the center, and determines which of the five regions is applicable to the inclination direction of the position indication unit.

15. The touch detection device according to claim 11, wherein the coordinate correction unit sets nine regions obtained by dividing the touch detection surface into three in the first direction and into three in the second direction with the input position on the touch detection surface being at the center, and determines which of the nine regions is applicable to the inclination direction of the position indication unit.

16. A display device with a touch detection function comprising:
- a plurality of drive electrodes, each extending in a first direction;
- a plurality of detection electrodes, each extending in a second direction intersecting with the first direction, so as to form capacitance at intersections with the drive electrodes;
- a display unit configured to perform displaying based on pixel signals and display drive signals;
- a drive electrode driver configured to perform
    - first driving and scanning to sequentially and time-divisionally apply the display drive signals to the drive electrodes, and
    - second driving and scanning to sequentially and time-divisionally apply drive signals for detecting proximity or contact of an external object to the drive electrodes, to sequentially and time-divisionally select a predetermined number of drive target electrodes to which the drive signals are to be applied from the drive electrodes, and to perform driving and scanning at a scanning pitch smaller than a total width of a drive range including the selected drive target electrodes; and
- a coordinate correction unit including a storage unit that is configured to store pieces of correction information corresponding to a distribution of detection signals output by the detection electrodes, the coordinate correction unit being configured to
    - use the correction information obtained from a relationship between a detection position detected by a combination of the detection electrodes and the drive electrodes and an input position at which an external object is in proximity to or in contact with a touch detection surface,
    - determine an inclination direction of a position indication unit for performing an input operation, based on the distribution of the detection signals,
    - select the correction information corresponding to the inclination direction of the position indication unit, and
    - correct the detection position in the first direction.

* * * * *